(12) United States Patent
Taherzadeh Boroujeni et al.

(10) Patent No.: US 11,963,232 B2
(45) Date of Patent: Apr. 16, 2024

(54) BEAM REFINEMENT USING CHANNEL STATE INFORMATION REFERENCE SIGNAL IN RANDOM ACCESS PROCEDURE

(71) Applicant: QUALCOMM Incorporated, San Diego, CA (US)

(72) Inventors: Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 230 days.

(21) Appl. No.: 17/408,171

(22) Filed: Aug. 20, 2021

(65) Prior Publication Data

US 2022/0070940 A1    Mar. 3, 2022

Related U.S. Application Data

(60) Provisional application No. 63/074,357, filed on Sep. 3, 2020, provisional application No. 63/074,367, filed on Sep. 3, 2020, provisional application No. 63/074,376, filed on Sep. 3, 2020.

(51) Int. Cl.
*H04W 72/04*    (2023.01)
*H04L 5/00*    (2006.01)
*H04W 72/23*    (2023.01)
*H04W 74/0833*    (2024.01)
*H04W 76/00*    (2018.01)
*H04W 88/08*    (2009.01)

(52) U.S. Cl.
CPC ....... *H04W 74/0833* (2013.01); *H04L 5/0048* (2013.01); *H04W 72/23* (2023.01)

(58) Field of Classification Search
CPC ............ H04W 74/0833; H04W 72/23; H04W 5/0048
USPC ....................................................... 370/329
See application file for complete search history.

(56) References Cited

U.S. PATENT DOCUMENTS

| 2017/0207843 | A1* | 7/2017 | Jung ................... H04W 74/006 |
| 2018/0176958 | A1* | 6/2018 | Islam ................ H04W 74/0833 |
| 2020/0053607 | A1* | 2/2020 | Ingale ............... H04W 74/0833 |
| 2020/0059967 | A1* | 2/2020 | Kim .................. H04W 74/0833 |
| 2021/0152235 | A1* | 5/2021 | Zhou ..................... H04W 72/53 |

OTHER PUBLICATIONS

Huawei (R2-1709261, "Beam refinement during random access", Aug. 21-25, 2017), (Year: 2017).*

(Continued)

*Primary Examiner* — Maharishi V Khirodhar
(74) *Attorney, Agent, or Firm* — Sevan Savsa; Loza & Loza LLP

(57) ABSTRACT

Aspects of the present disclosure provide methods, systems, devices, and apparatuses that support coverage enhancement techniques in a random access procedure. In a random access procedure, a UE may attempt to connect to a base station by transmitting a random access request to the base station. The base station may respond to the random access request by transmitting, to the UE, a random access response (RAR). In some aspects, the base station can transmit a channel-state information reference signal (CSI-RS) to facilitate beam-refinement for coverage enhancement during the random access procedure.

24 Claims, 19 Drawing Sheets

(56) References Cited

OTHER PUBLICATIONS

ZTE Corporation (R1-2005429, Discussion on potential techniques for channels other than PUSCH and PUCCH, Aug. 17-28, 2020), (Year: 2020).*

Qualcomm (R2-1805212, Measurement reporting and beam refinement during RACH, Apr. 16-20, 2018), (Year: 2018).*

* cited by examiner

BEAM REFINEMENT USING CHANNEL STATE INFORMATION REFERENCE SIGNAL IN RANDOM ACCESS PROCEDURE

PRIORITY CLAIM

This application claims priority to and the benefit of provisional patent application No. 63/074,367 filed in the United States Patent Office on Sep. 3, 2020, provisional patent application No. 63/074,357 filed in the United States Patent Office on Sep. 3, 2020, and provisional patent application No. 63/074,376 filed in the United States Patent Office on Sep. 3, 2020, the entire content of each application is incorporated herein by reference as if fully set forth below in its entirety and for all applicable purposes.

TECHNICAL FIELD

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). A UE can use a random access channel (RACH) procedure to gain access to a wireless network. Using the RACH procedure, the UE can achieve synchronization with the network and obtain communication resources to communicate with the network. In an NR network, especially for higher frequency bands (e.g., FR2 or higher), signal coverage issues may occur during the RACH procedure.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). A UE can use a random-access channel (RACH) procedure to gain access to a wireless network. Using the RACH procedure, the UE can achieve synchronization with the network and obtain communication resources to communicate with the network. In an NR network, especially for higher frequency bands (e.g., FR2), signal coverage issues may occur during the RACH procedure.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the disclosure provides a user equipment (UE) for wireless communication. The UE includes a transceiver for wireless communication, a memory, and a processor coupled with the transceiver and the memory. The processor and the memory are configured to transmit, to a scheduling entity, a first message that initiates a random access channel (RACH) procedure. The processor and the memory are further configured to receive, from the scheduling entity, a second message of the RACH procedure. The second message includes an indication of one or more channel state information reference signal (CSI-RS) resources for receiving a plurality of CSI-RSs from the scheduling entity. The processor and the memory are further configured to receive the plurality of CSI-RSs using the one or more CSI-RS resources for facilitating beam refinement at the UE or the scheduling entity. The processor and the memory are further configured to transmit a third message of the RACH procedure after receiving the plurality of CSI-RSs measured by the UE.

One aspect of the disclosure provides a method for wireless communication at a user equipment (UE). The method includes transmitting, to a scheduling entity, a first message that initiates a random access channel (RACH) procedure. The method further includes receiving, from the scheduling entity, a second message of the RACH procedure. The second message includes an indication of one or more channel state information reference signal (CSI-RS) resources for receiving a plurality of CSI-RSs from the scheduling entity. The method further includes receiving the plurality of CSI-RSs using the one or more CSI-RS resources for facilitating beam refinement at the UE or the scheduling entity. The method further includes transmitting a third message of the RACH procedure after receiving the plurality of CSI-RSs measured by the UE.

One aspect of the disclosure provides a scheduling entity for wireless communication. The scheduling entity includes a transceiver for wireless communication, a memory, and a processor coupled with the transceiver and the memory. The processor and the memory are configured to receive, from a UE, a first message that initiates a RACH procedure. The processor and the memory are further configured to transmit, to the UE, a second message of the RACH procedure. The second message includes an indication of one or more channel state information reference signal (CSI-RS) resources for transmitting a plurality of CSI-RSs. The processor and the memory are further configured to transmit the plurality of CSI-RSs using the one or more CSI-RS resources for facilitating beam refinement at the UE or the scheduling entity. The processor and the memory are further configured to receive a third message of the RACH procedure after transmitting the plurality of CSI-RSs.

One aspect of the disclosure provides a method of wireless communication at a scheduling entity. The method includes receiving, from a UE, a first message that initiates a RACH procedure. The method further includes transmitting, to the UE, a second message of the RACH procedure, the second message comprising an indication of one or more CSI-RS resources for transmitting a plurality of CSI-RSs to the UE. The method further includes transmitting the plurality of CSI-RSs using the one or more CSI-RS resources for facilitating beam refinement at the UE or the scheduling entity. The method further includes receiving a third message of the RACH procedure after transmitting the plurality of CSI-RSs.

These and other aspects of the invention will become more fully understood upon a review of the detailed description, which follows. Other aspects, features, and implementations will become apparent to those of ordinary skill in the art, upon reviewing the following description of specific, exemplary implementations in conjunction with the accompanying figures. While features may be discussed relative to certain examples and figures below, all implementations can include one or more of the advantageous features discussed herein. In other words, while one or more implementations may be discussed as having certain advantageous features, one or more of such features may also be used in accordance with the various examples discussed herein. In a similar fashion, while exemplary implementations may be discussed below as device, system, or method implementations, it should be understood that such exemplary implementations can be implemented in various devices, systems, and methods.

DETAILED DESCRIPTION

Figure 1:
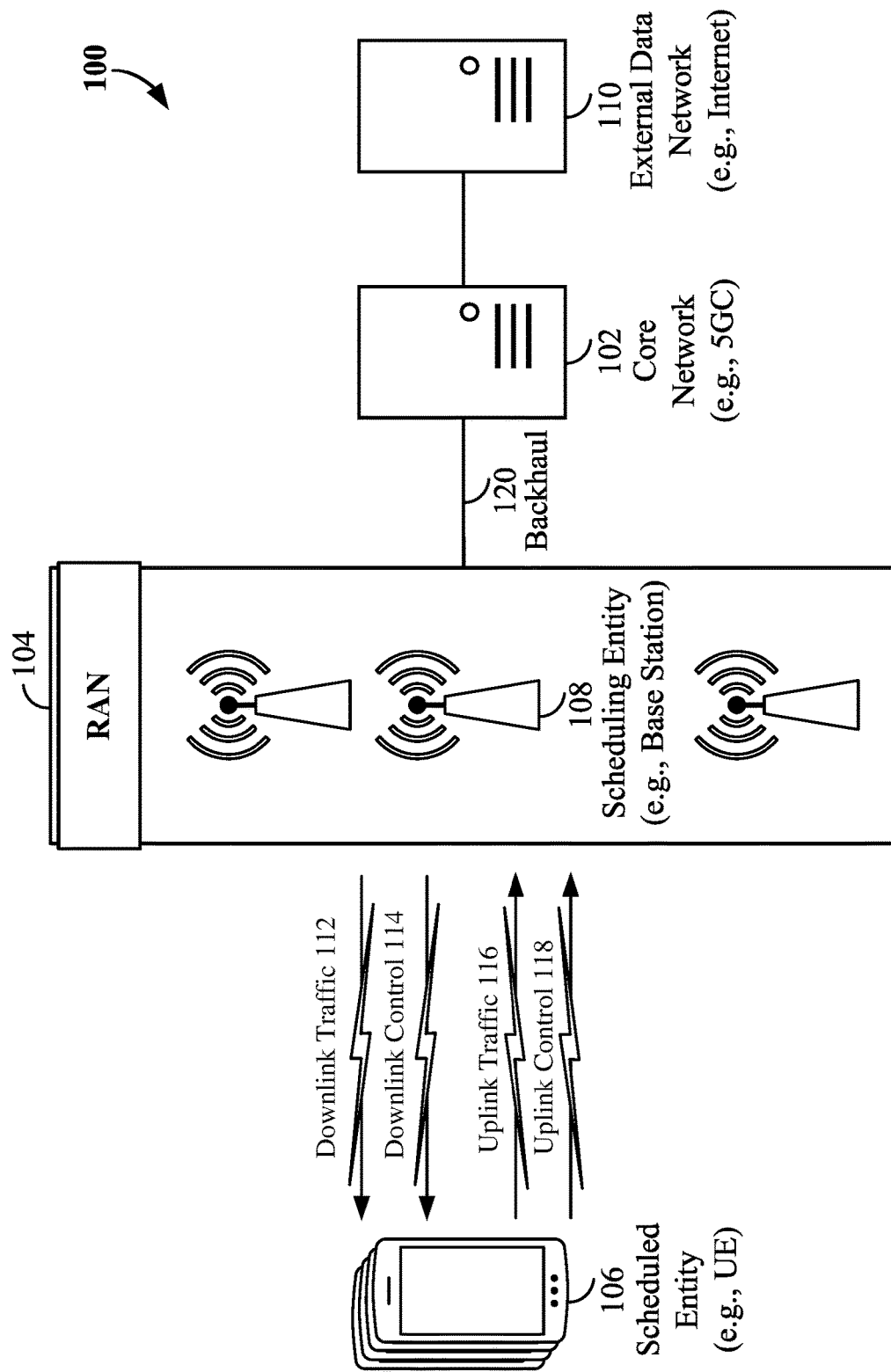
FIG. 1 is a schematic illustration of a wireless communication system according to some aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Aspects of the present disclosure provide methods, systems, devices, and apparatuses that support coverage enhancement techniques in a random access procedure. Generally, the described techniques can provide for a more robust random access procedure between a user equipment (UE) and a base station. In a random access procedure, a UE may attempt to connect to a base station by transmitting a random access request (also known as message 1) to the base station. The base station may respond to the random access request by transmitting, to the UE, a random access response (RAR) (also known as message 2). In some aspects, the base station can transmit a channel-state information reference signal (CSI-RS) to facilitate beam-refinement for coverage enhancement during the random access procedure.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108. The scheduled entity 106 may further transmit uplink control information 118, including but not limited to a scheduling request or feedback information, or other control information to the scheduling entity 108.

In addition, the uplink and/or downlink control information and/or traffic information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
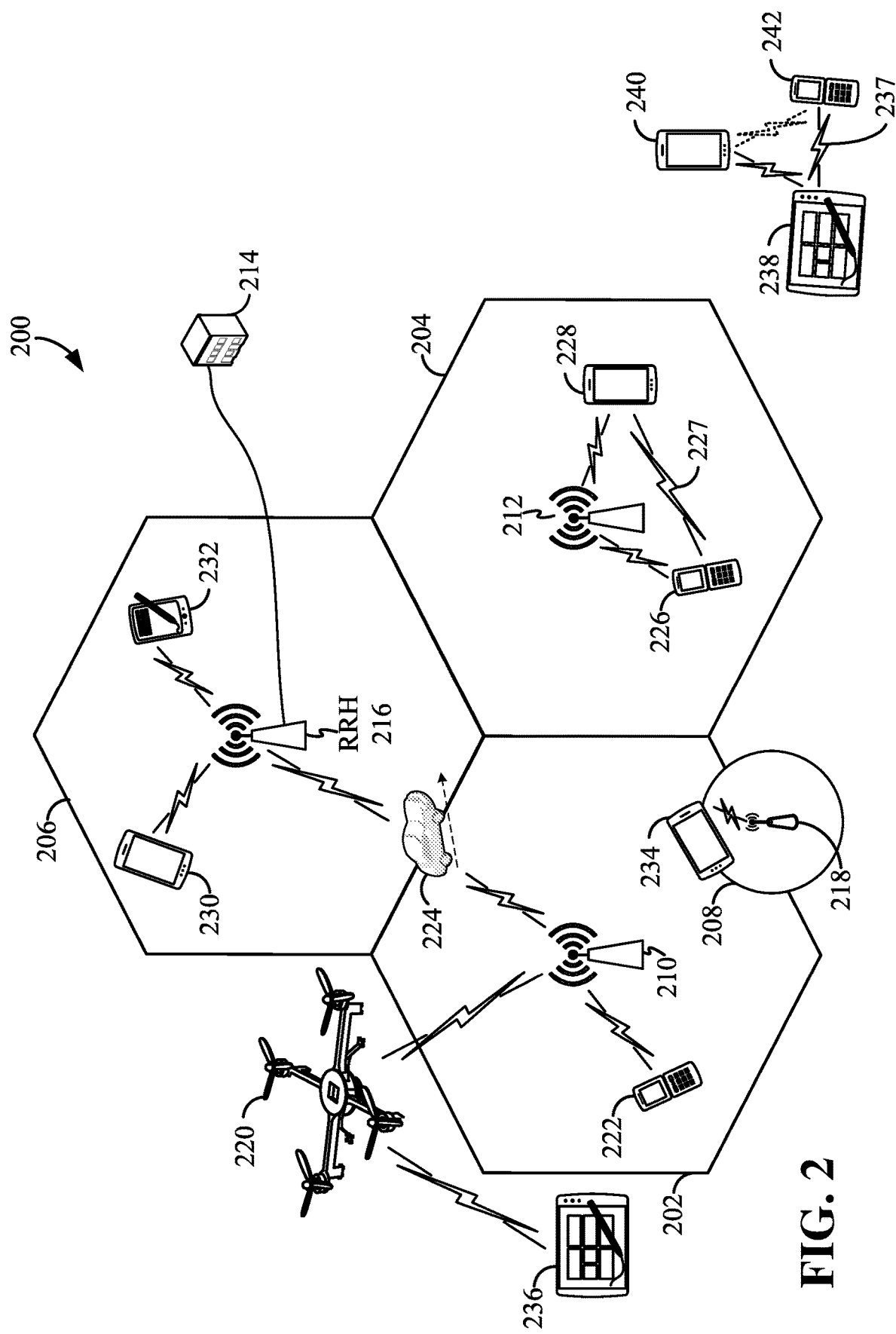
FIG. 2 is an illustration of an exemplary radio access network according to some aspects of the disclosure.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 238, 240, and 242) may communicate with each other using peer-to-peer (P2P) or sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication. In either case, such sidelink signaling 227 and 237 may be implemented in a P2P network, a device-to-device (D2D) network, vehicle-to-vehicle (V2V) network, a vehicle-to-everything (V2X), a mesh network, or other suitable direct link network.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) and a security anchor function (SEAF) that perform authentication. The SCMF can manage, in whole or in part, the security context for both the control plane and the user plane functionality.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may hand over the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Further, the air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
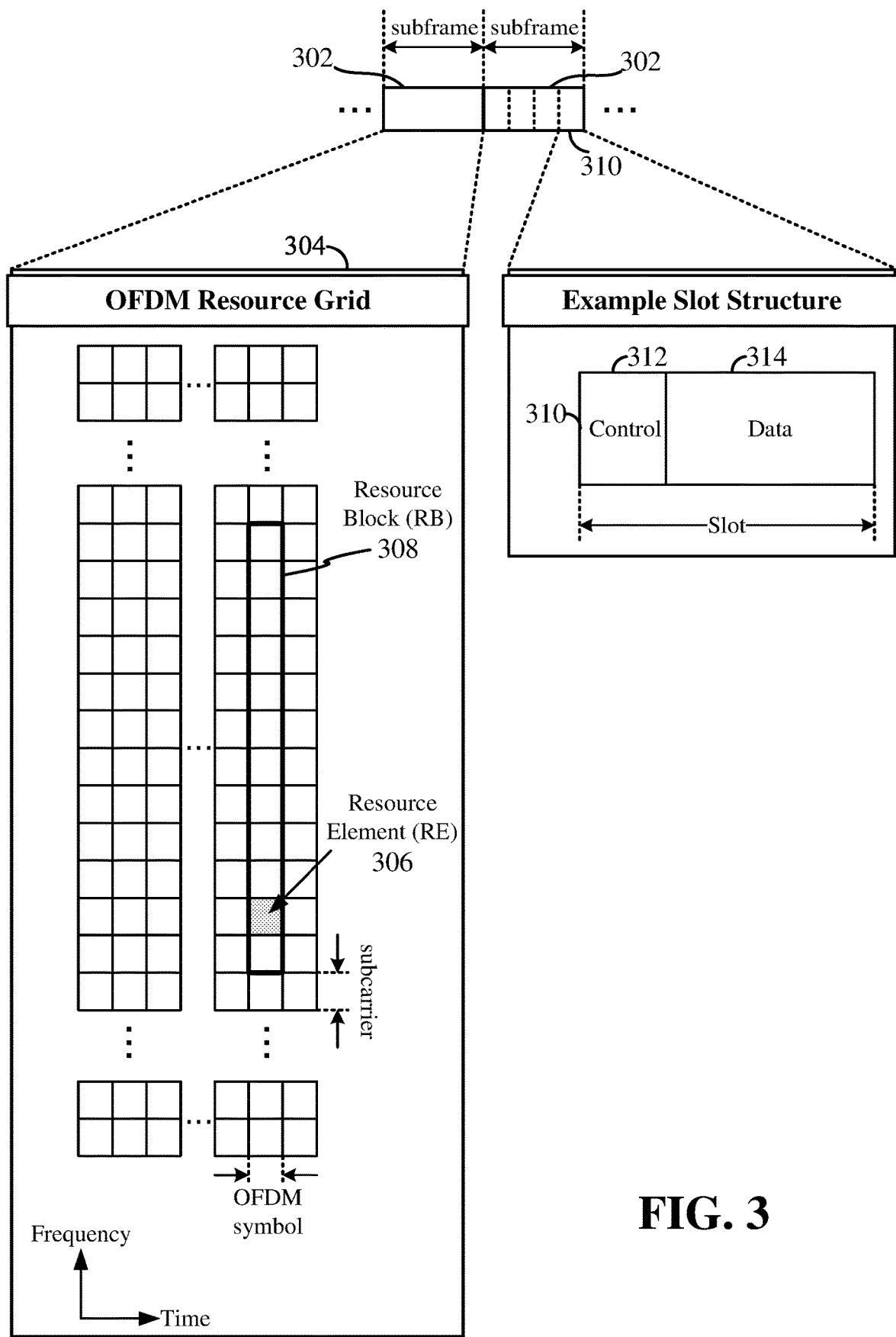
FIG. 3 is a diagram illustrating an example of a frame structure for use in a radio access network according to some aspects of the disclosure.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 4:
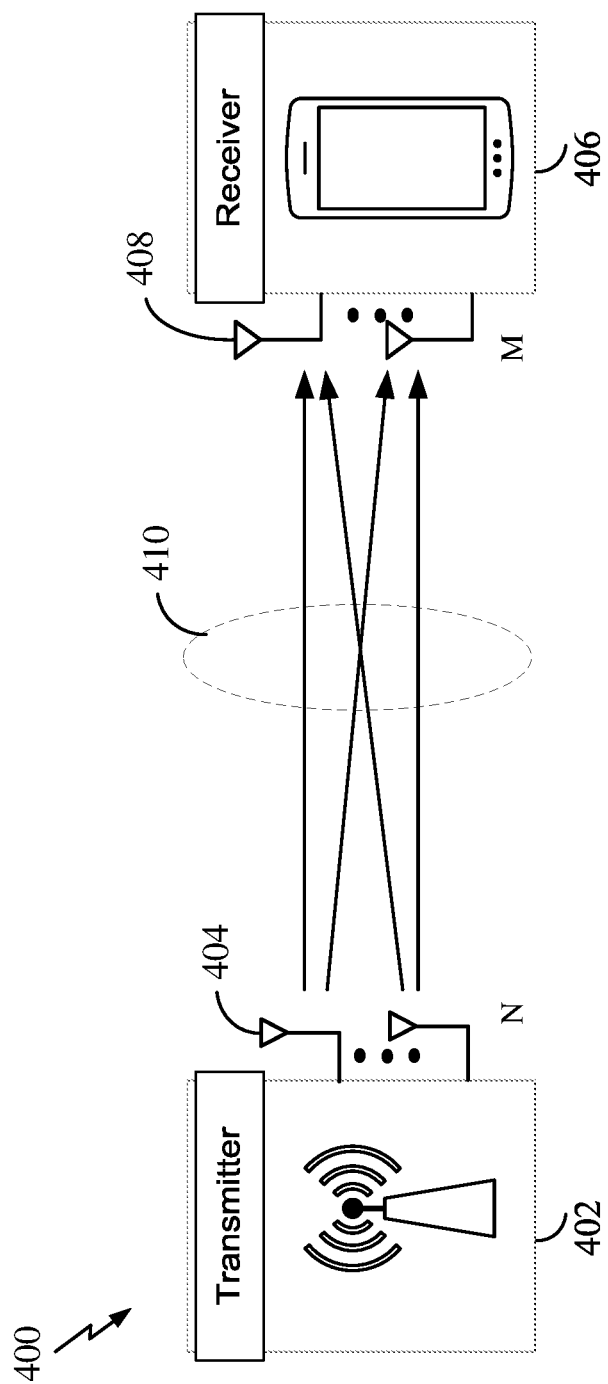
FIG. 4 is a block diagram illustrating a wireless communication system supporting multiple-input multiple-output (MIMO) and beamforming communication according to some aspects of the disclosure.

In some aspects of the disclosure, the scheduling entity and/or scheduled entity may be configured for beamforming and/or multiple-input multiple-output (MIMO) technology. FIG. 4 illustrates an example of a wireless communication system 400 supporting MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit CSI-RSs with separate C-RS sequences for each layer to provide for multi-layer channel estimation. From the CSI-RS, the UE may measure the channel quality across layers and resource blocks and feed back the RI and a channel quality indicator (CQI) that indicates to the base station a modulation and coding scheme (MCS) to use for transmissions to the UE for use in updating the rank and assigning REs for future downlink transmissions.

In the simplest case, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

In 5G New Radio (NR) systems, particularly for FR2 (millimeter wave) systems, beamformed signals may be utilized for most downlink channels, including the physical downlink control channel (PDCCH) and physical downlink shared channel (PDSCH). In addition, broadcast control information, such as the synchronization signal block (SSB), slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH). In addition, beamformed signals may further be utilized in D2D systems, such as NR sidelink (SL) or V2X, utilizing FR2.

Figure 5:
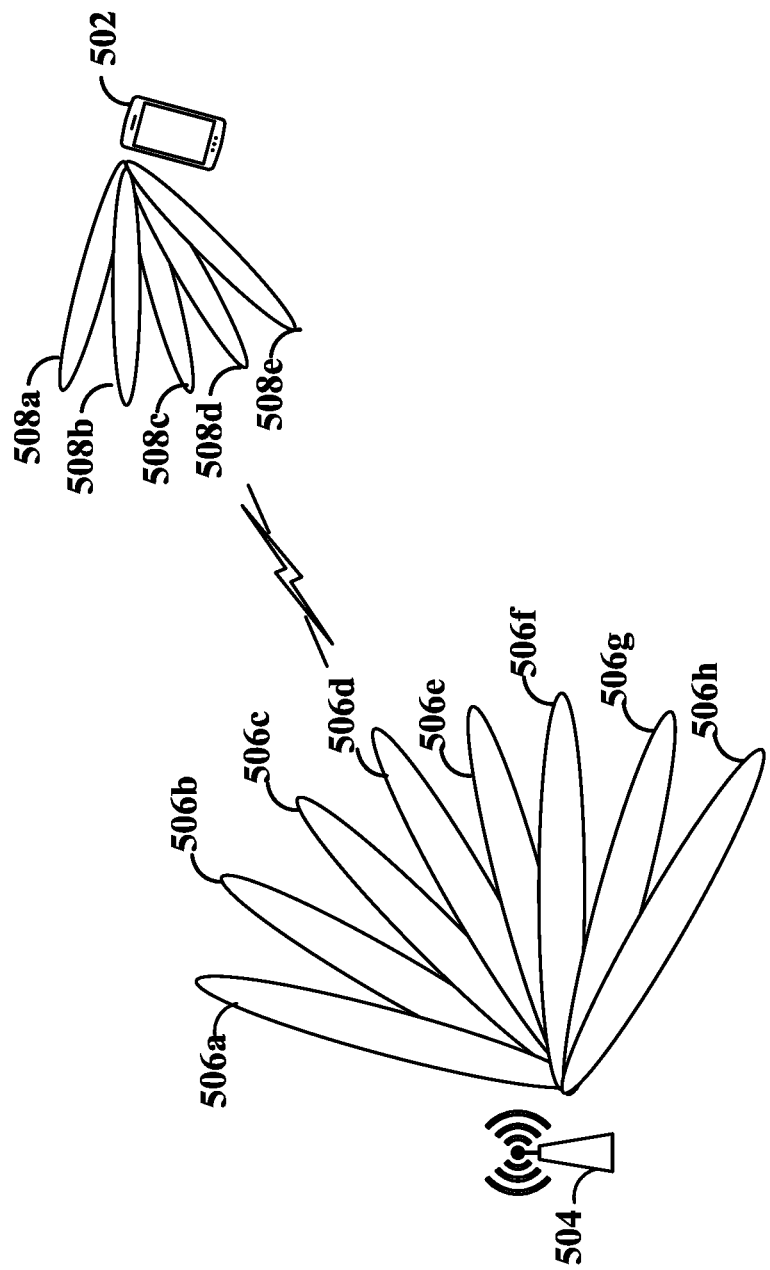
FIG. 5 is a diagram illustrating beamformed communication between a base station and a user equipment (UE) according to some aspects of the disclosure.

FIG. 5 is a diagram illustrating communication between a base station 504 and a UE 502 using beamformed signals according to some aspects. The base station 504 may be any of the base stations (e.g., gNBs) or scheduling entities illustrated in FIGS. 1 and/or 2, and the UE 502 may be any of the UEs or scheduled entities illustrated in FIGS. 1 and/or 2.

The base station 504 may generally be capable of communicating with the UE 502 using one or more transmit beams, and the UE 502 may further be capable of communicating with the base station 504 using one or more receive beams. As used herein, the term transmit beam refers to a beam on the base station 504 that may be utilized for downlink or uplink communication with the UE 502. In addition, the term receive beam refers to a beam on the UE 502 that may be utilized for downlink or uplink communication with the base station 504.

In the example shown in FIG. 5, the base station 504 is configured to generate a plurality of transmit beams 506a-506h, each associated with a different spatial direction. In addition, the UE 502 is configured to generate a plurality of receive beams 508a-508e, each associated with a different spatial direction. It should be noted that while some beams are illustrated as adjacent to one another, such an arrangement may be different in different aspects. For example, transmit beams 506a-506h transmitted during a same symbol may not be adjacent to one another. In some examples, the base station 504 and UE 502 may each transmit more or less beams distributed in all directions (e.g., 360 degrees) and in three dimensions. In addition, the transmit beams 506a-506h may include beams of varying beam width. For example, the base station 504 may transmit certain signals (e.g., SSBs) on wider beams and other signals (e.g., CSI-RSs) on narrower beams.

The base station 504 and UE 502 may select one or more transmit beams 506a-506h on the base station 504 and one or more receive beams 508a-508e on the UE 502 for communication of uplink and downlink signals therebetween using a beam management procedure. In one example, during initial cell acquisition, the UE 502 may perform a P1 beam management procedure to scan the plurality of transmit beams 506a-506h on the plurality of receive beams 508a-508e to select a beam pair link (e.g., one of the transmit beams 506a-506h and one of the receive beams 508a-508e) for a physical random access channel (PRACH) procedure for initial access to the cell. For example, periodic SSB beam sweeping may be implemented on the base station 504 at certain intervals (e.g., based on the SSB periodicity). Thus, the base station 504 may be configured to sweep or transmit an SSB on each of a plurality of wider transmit beams 506a-506h during the beam sweeping interval. The UE may measure the reference signal received power (RSRP) of each of the SSB transmit beams on each of the receive beams of the UE and select the transmit and receive beams based on the measured RSRP. In an example, the selected receive beam may be the receive beam on which the highest RSRP is measured, and the selected transmit beam may have the highest RSRP as measured on the selected receive beam.

After completing the PRACH procedure, the base station 504 and UE 502 may perform a P2 beam management procedure for beam refinement at the base station 504. For example, the base station 504 may be configured to sweep or transmit a CSI-RS on each of a plurality of narrower transmit beams 506a-506h. Each of the narrower CSI-RS beams may be a sub-beam of the selected SSB transmit beam (e.g., within the spatial direction of the SSB transmit beam). Transmission of the CSI-RS transmit beams may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)). The UE 502 is configured to scan the plurality of CSI-RS transmit beams 506a-506h on the plurality of receive beams 508a-508e. The UE 502 then performs beam measurements (e.g., RSRP, SINR, etc.) of the received CSI-RSs on each of the receive beams 508a-508e to determine the respective beam quality of each of the CSI-RS transmit beams 506a-506h as measured on each of the receive beams 508a-508e.

The UE 502 can then generate and transmit a Layer 1 (L1) measurement report, including the respective beam index (e.g., CSI-RS resource indicator (CRI)) and beam measurement (e.g., RSRP or SINR) of one or more of the CSI-RS transmit beams 506a-506h on one or more of the receive beams 508a-508e to the base station 504. The base station 504 may then select one or more CSI-RS transmit beams on which to communicate downlink and/or uplink control and/or data with the UE 502. In some examples, the selected CSI-RS transmit beam(s) have the highest RSRP from the L1 measurement report. Transmission of the L1 measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The UE 502 may further select a corresponding receive beam on the UE 502 for each selected serving CSI-RS transmit beam to form a respective beam pair link (BPL) for each selected serving CSI-RS transmit beam. For example, the UE 502 can utilize the beam measurements obtained during the P2 procedure or perform a P3 beam management procedure to obtain new beam measurements for the selected CSI-RS transmit beams to select the corresponding receive beam for each selected transmit beam. In some examples, the selected receive beam to pair with a particular CSI-RS transmit beam may be the receive beam on which the highest RSRP for the particular CSI-RS transmit beam is measured.

In some examples, in addition to performing CSI-RS beam measurements, the base station 504 may configure the UE 502 to perform SSB beam measurements and provide an L1 measurement report containing beam measurements of SSB transmit beams 506a-506h. For example, the base station 504 may configure the UE 502 to perform SSB beam measurements and/or CSI-RS beam measurements for beam failure detection (BRD), beam failure recovery (BFR), cell reselection, beam tracking (e.g., for a mobile UE 502 and/or base station 504), or other beam optimization purpose.

In addition, when the channel is reciprocal, the transmit and receive beams may be selected using an uplink beam management scheme. In an example, the UE 502 may be configured to sweep or transmit on each of a plurality of receive beams 508a-508e. For example, the UE 502 may transmit an SRS on each beam in different beam directions. In addition, the base station 504 may be configured to receive the uplink beam reference signals on a plurality of transmit beams 506a-506h. The base station 504 then performs beam measurements (e.g., RSRP, SINR, etc.) of the beam reference signals on each of the transmit beams 506a-506h to determine the respective beam quality of each of the receive beams 508a-508e as measured on each of the transmit beams 506a-506h.

The base station 504 may then select one or more transmit beams on which to communicate downlink and/or uplink control and/or data with the UE 502. In some examples, the selected transmit beam(s) have the highest RSRP. The UE 502 may then select a corresponding receive beam for each selected serving transmit beam to form a respective beam pair link (BPL) for each selected serving transmit beam, using, for example, a P3 beam management procedure, as described above.

In one example, a single CSI-RS transmit beam (e.g., beam 506d) on the base station 504 and a single receive beam (e.g., beam 508c) on the UE may form a single BPL used for communication between the base station 504 and the UE 502. In another example, multiple CSI-RS transmit beams (e.g., beams 506c, 506d, and 506e) on the base station 504 and a single receive beam (e.g., beam 508c) on the UE 502 may form respective BPLs used for communication between the base station 504 and the UE 502. In another example, multiple CSI-RS transmit beams (e.g., beams 506c, 506d, and 506e) on the base station 504 and multiple receive beams (e.g., beams 508c and 508d) on the UE 502 may form multiple BPLs used for communication between the base station 504 and the UE 502. In this example, a first BPL may include transmit beam 506c and receive beam 508c, a second BPL may include transmit beam 508d and receive beam 508c, and a third BPL may include transmit beam 508e and receive beam 508d.

Random Access Procedure with Coverage Enhancement

To access a cell, a UE (e.g., scheduled entity 106) first acquires time and frequency synchronization with a cell (e.g., a base station 108 in RAN 200) and decodes the Cell ID of that cell. In a 5G NR network, a UE can tune to a specific frequency of the cell and try to detect the PSS and SSS broadcasted by the cell. The UE can decode the PSS and SSS to obtain the Cell ID. Once the UE successfully detects the PSS/SSS, the UE tries to decode the PBCH that carries the minimum system information (MSI) (e.g., MIB). The MSI in the PBCH may include, for example, scheduling information indicating time-frequency resources allocated for a COERSET0. In some examples, the CORESET0 may be transmitted within the first four symbols (e.g., within a control region) of a slot. In addition, the CORESET0 carries a PDCCH with DCI that contains scheduling information for scheduling the SIB1. The SIB1 including the RMSI is carried within a physical downlink shared channel (PDSCH). Therefore, once the UE successfully decodes the PBCH, the UE tries to decode the PDCCH to obtain the scheduling information for the PDSCH carrying the SIB1 including RMSI and any OSI (e.g., other SIBs). In 5G NR, the PSS, SSS, and PBCH are transmitted in an SS Block (SSB). In one example, an SSB consists of four symbols (1-symbol PSS, 1-symbol SSS, and 2-symbol PBCH).

Figure 6:
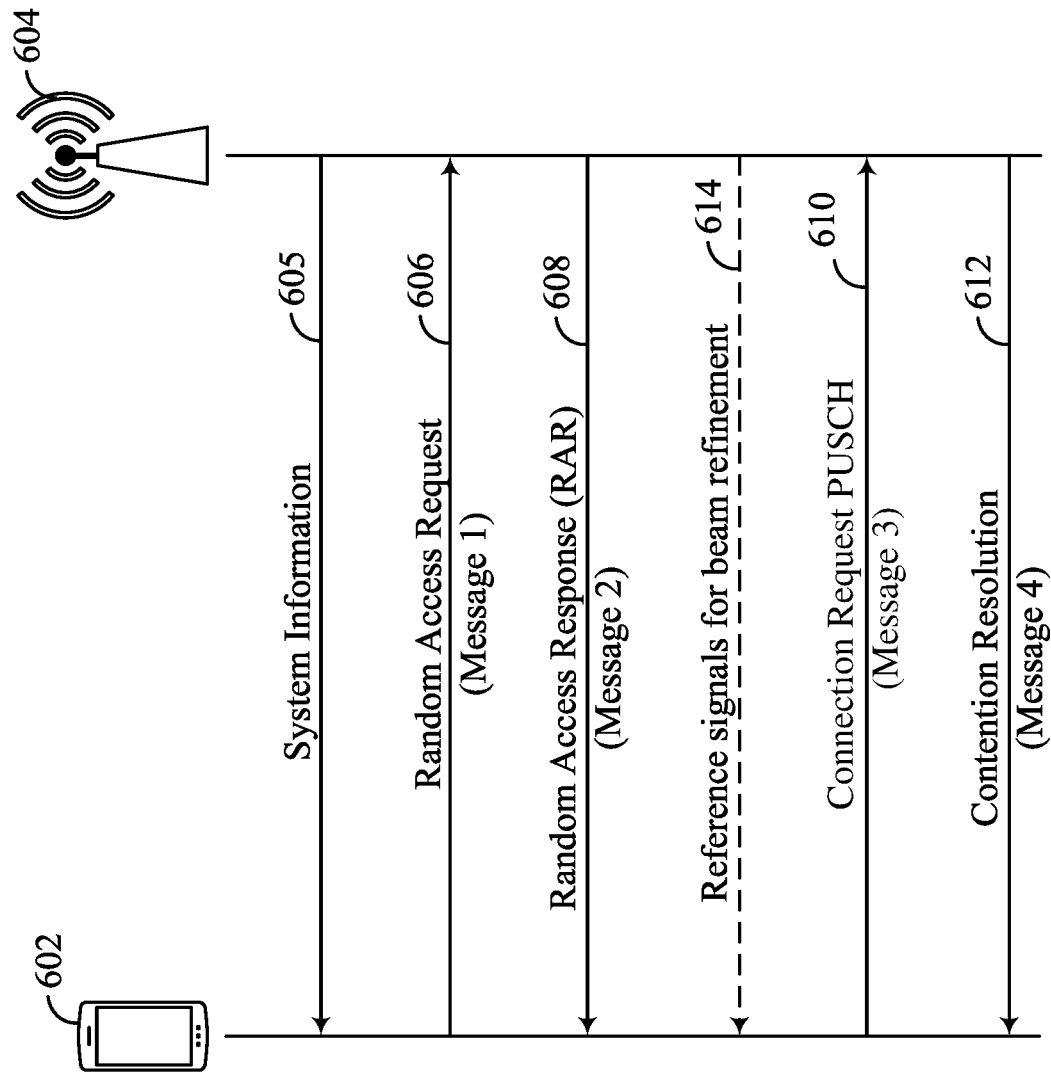
FIG. 6 is a diagram illustrating a random access channel (RACH) procedure using coverage enhancement techniques according to some aspects of the disclosure.

FIG. 6 is a diagram illustrating a random access procedure between a UE 602 and a base station (BS) 604 using coverage enhancement techniques according to some aspects of the disclosure. The base station 604 may be any of the base stations (e.g., gNBs) or scheduling entities illustrated in FIGS. 1, 2, 4, and 5, and the UE 602 may be any of the UEs or scheduled entities illustrated in FIGS. 1, 2, 4, and 5.

The UE 602 may attempt to connect to the base station 604 using an initial access procedure (e.g., a RACH procedure). After the UE receives and decodes system information 605 (e.g., SSB, SIB1) from the base station, the UE may identify a random access search space including PRACH resources for initiating a RACH procedure from the system information (e.g., SIB1). The RACH procedure may be performed in various scenarios, such as initial access, loss of uplink synchronization, lack of available PUCCH resources, scheduling request failure, beam failure detection, handover, and other use cases. In addition, a RACH procedure may be contention-based or contention-free.

In one example, to initiate a RACH procedure, the UE 602 may transmit a random access request 606 (also known as message 1) associated with the RACH procedure to the base station 604. For example, the random access request 606 may include a physical random access channel (PRACH) preamble to indicate the resource requirement of the UE for the RACH procedure. The UE may transmit the random access request 606 on a beam (e.g., receive beam) selected by the UE based on beam measurements (e.g., RSRP, RSRQ, and/or SINR) performed by the UE on a plurality of SSB beams (e.g., one or more transmit beams 506a to 506h of FIG. 5) during, for example, the P1 beam management procedure.

The base station 604 may acknowledge the random access request 606 by transmitting a random access response (RAR) 608 (also known as message 2) associated with the RACH procedure. The UE 602 may expect to receive the RAR 608 during a predetermined time window (e.g., an RAR window). For example, the RAR 608 may include PDCCH and PDSCH transmissions. The RAR 608 (PDCCH and PDSCH) can include an identifier of the preamble sent by the UE, a timing advance (TA), a temporary cell radio network temporary identifier (TC-RNTI) or random access (RA) RNTI for the UE, and a grant of assigned uplink (UL) resources. A medium access control-control element (MAC-CE) sent on the PDSCH can provide an acknowledgment of the reception of the random access request 606 and the UL grant. In some aspects, the base station 604 may transmit downlink control information (DCI) via the PDCCH of message 2 to indicate the communication resources (e.g., frequency and time resources) where the UE may receive the PDSCH data of RAR 608 (message 2). From message 2, the UE 602 can determine the communication resources for transmitting an RRC Connection Request 610 (also known as message 3) on a PUSCH to the base station 604. After the UE has transmitted message 3, the UE can start monitoring for a contention resolution message 612 (also known as message 4) on a PDSCH to complete the RACH procedure.

During the RACH procedure, the UE 602 and the base station 604 may be in a low connectivity condition in certain beam directions. For example, any of the RACH messages (e.g., message 2, message 3, and/or message 4) may have coverage issues, especially when higher frequency ranges (e.g., FR2 or higher) are used for the communication between the UE 602 and the base station 604. A low connectivity or coverage condition may occur due to a variety of reasons, such as beam width and environmental factors (e.g., separation distance, signal obstruction, etc.). Such conditions may result in an increase in communication failures over the communication link. In some cases, the UE 602 may be unable to successfully complete the RACH procedure. In that case, the UE 602 and the base station 604 cannot establish a communication link using the RACH procedure.

UE-Side Beam Refinement in a RACH Procedure

In some aspects of the disclosure, the base station 604 and UE 602 may perform beam refinement for coverage enhancement during the RACH procedure. To facilitate beam refinement, the base station 604 can transmit a plurality of reference signals 614 (e.g., CSI-RSs) using one or more transmit beams that may be used for communication with the UE 602. For example, the base station 604 can select the transmit beam using the P2 beam management procedure described above. In one aspect, for UE-side beam refinement, the base station can transmit the reference signals 614 (e.g., CSI-RSs) using the same transmit beam. The UE can measure a respective reference signal (CSI-RS) on different OFDM symbols using different receive beams and then select the best UE-side beam (e.g., based on RSRP measurements of CSI-RSs) for future use during the RACH procedure (for both transmitting and receiving at UE side).

Figure 7:
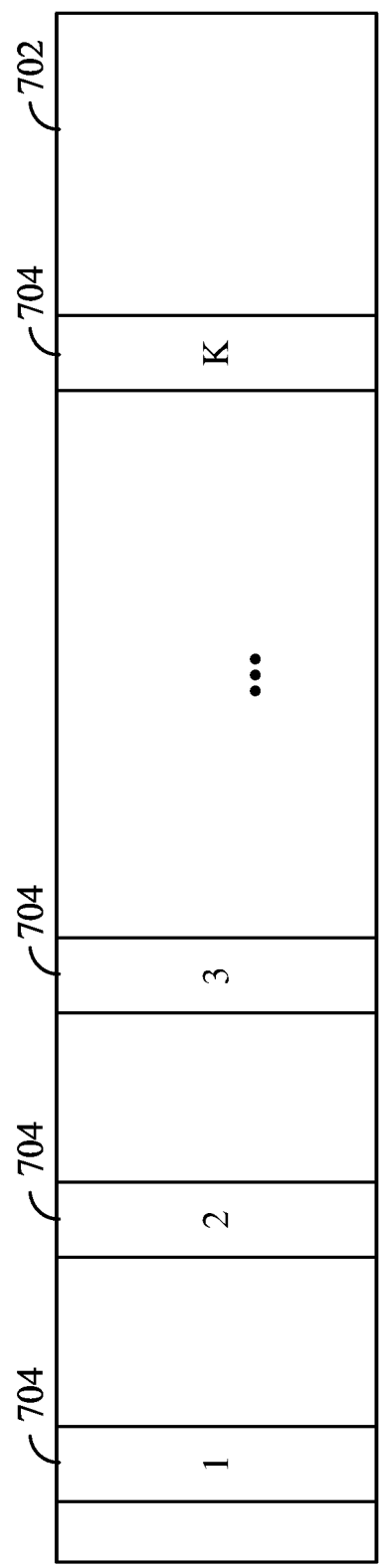
FIG. 7 is a diagram illustrating an example of reference signal transmissions for enabling UE-side beam refinement according to some aspects of the disclosure.

FIG. 7 is a diagram illustrating an example of reference signal transmissions for enabling UE-side beam refinement. In some examples, the reference signal transmissions may include CSI-RSs. In some aspects, the UE 602 can use the above-described P3 beam management procedure to perform UE-side beam refinement based on the CSI-RSs. Referring to FIG. 7, which will be discussed in connection with FIG. 6, the base station 604 may transmit multiple reference signals (e.g., CSI-RSs) in a slot 702 or subframe. For example, the reference signals may include k reference signals respectively transmitted on k OFDM symbols. Four exemplary reference signal transmissions (e.g., CSI-RS 704) are illustrated in FIG. 7. In other aspects, the base station can transmit CSI-RSs using a repetition pattern different from that shown in FIG. 7. In some examples, the base station may transmit the CSI-RSs before message 2 PDSCH. In some examples, the base station may transmit the CSI-RSs between message 2 PDSCH and message 3 of a RACH procedure.

In one aspect, the base station may provide scheduling information of the reference signals (e.g., CSI-RSs 704) using the PDCCH in message 2. In one example, the DCI of the message 2 PDCCH may have a field or data that indicates the communication resources (e.g., time-frequency resources) for the CSI-RSs 704. In one example, the UE 602 can determine the resources for receiving the CSI-RSs 704 from message 2 in PDCCH (e.g., DCI). In another example, the UE can determine the resources of the CSI-RSs 704 based on the resources used for receiving the message 2 in PDCCH according to a predetermined rule that may be indicated by the DCI and/or pre-configured on the UE by the original equipment manufacturer (OEM), as may be defined in a specification or standard that governs the communication between the UE and base station. In some aspects, the DCI may have a field that indicates that the UE does not need to provide a feedback or measurement report (e.g., CQI) for the CSI-RSs 704.

In one aspect, the base station may provide scheduling information of the CSI-RSs 704 using the PDSCH in message 2. In this case, the base station can use the PDSCH data or payload to explicitly indicate the resources for the CSI-RSs 704. Therefore, the UE can directly determine the resources (e.g., time and frequency resources) for receiving the CSI-RSs 704 from the PDSCH in message 2. In one example, the UE can determine the resources for the CSI-RSs 704 based on the resources used for the PDSCH (message 2) or message 3 according to a predetermined rule that may be indicated by the DCI and/or pre-configured on the UE by the OEM, as may be defined in a specification or standard that governs that communication between the UE and scheduling entity. The predetermined rule can be stored at the base station and UE.

Figure 8:
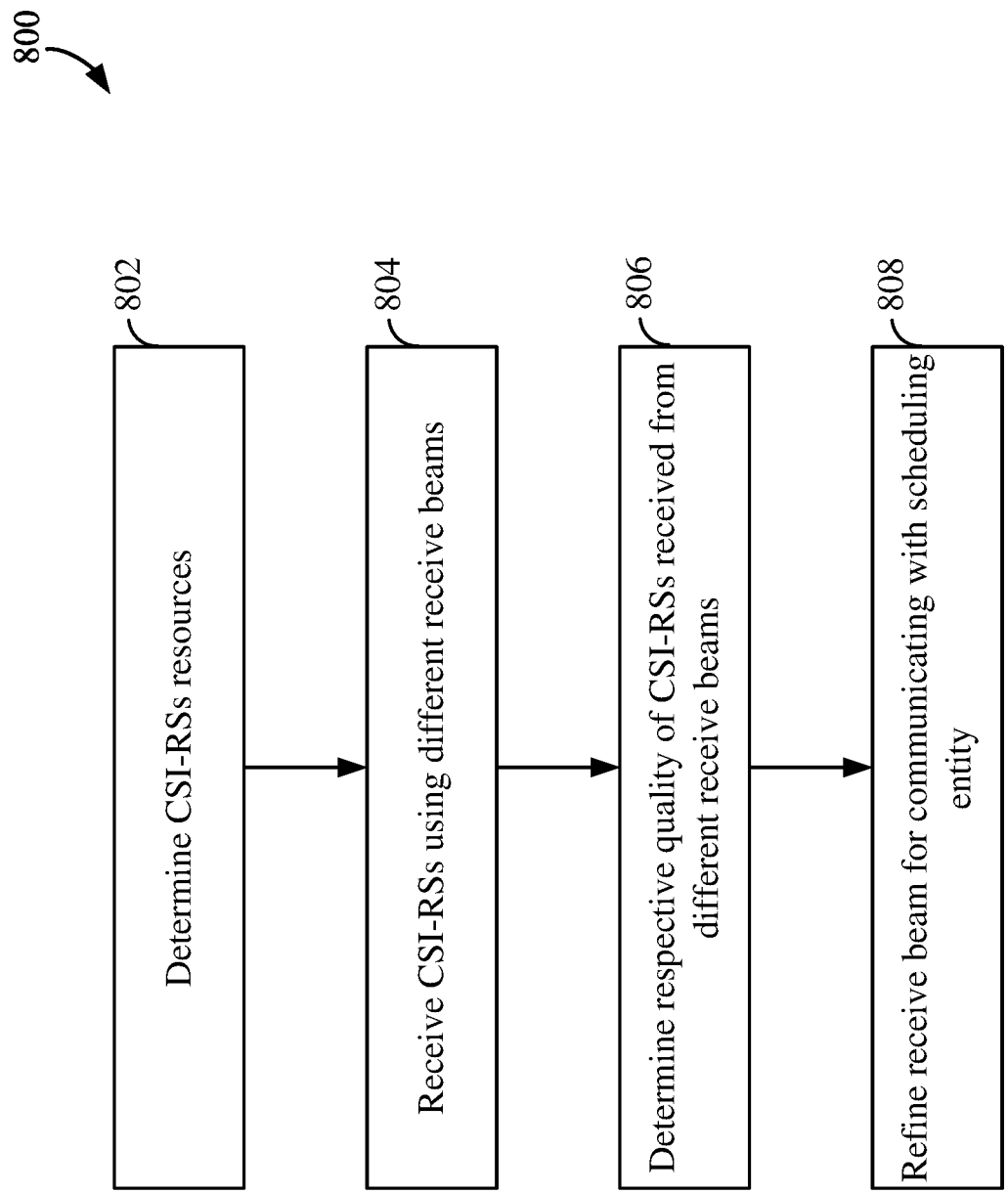
FIG. 8 is a flow chart illustrating a UE-side beam refinement process for coverage enhancement according to some aspects of the disclosure.

FIG. 8 is a flow chart illustrating a UE-side beam refinement process 800 using CSI-RS according to one aspect of the disclosure. For example, the base station 604 can transmit a plurality of CSI-RSs as described above in FIGS. 6 and 7 to facilitate UE-side beam refinement for coverage enhancement in a RACH procedure. At block 802, the UE 602 can determine the CSI-RS resources based on message 2 or message 3 of the RACH procedure as described above in relation to FIG. 7. Then, the UE can receive the CSI-RSs using the CSI-RS resources (e.g., time slots and one or more transmit beams). In some aspects, the base station can transmit the CSI-RSs in multiple transmissions (e.g., a repetition of CSI-RS transmissions) using the same transmit beam (e.g., one of the transmit beams 506a-506h) during the RACH procedure. At block 804, the UE can receive the CSI-RSs using a plurality of receive beams (e.g., receive beams 508a-508e of FIG. 5) that are different in their spatial directions.

At block 806, the UE can determine the respective quality of the CSI-RSs received on different receive beams. In one example, the base station can transmit the CSI-RSs on the same transmit beam. For example, the UE can perform beam measurements (e.g., RSRP, SINR, etc.) based on the CSI-RSs that are received on different receive beams to determine the respective quality of the CSI-RSs as measured on each of the receive beams.

At block 808, the UE can refine the receive beam for communicating (e.g., uplink and downlink communication) with the base station based on the measurements of the CSI-RSs. For example, the UE can select a receive beam (e.g., a refined sub-beam of the receive beam) with the best or better signal quality than the other receive beams in terms of, for example, RSRP or SINR of the CSI-RS.

BS-Side Beam Refinement in a RACH Procedure Using UE Feedback

In some aspects of the disclosure, using a RACH message (e.g., a PDCCH or a PDSCH of a message 2 in a RACH procedure), the base station can schedule CSI-RS resources and CSI-feedback for BS-side beam refinement (e.g., P2 beam management) before a message 3 of the RACH procedure. For example, a base station may generate and transmit a RACH message (e.g., message 2) to a UE to indicate the CSI-RS resources. The RACH message may include an indication of one or more CSI-RS resources for transmitting a plurality of CSI-RSs on a plurality of beams (e.g., transmit beams 506a to 506h). In some examples, the plurality of beams may be CSI-RS beams within the spatial direction of a transmit beam (e.g., SSB beam) that has been used to communicate with the UE. The base station may generate and transmit the plurality of CSI-RSs to the UE across the plurality of beams using the CSI-RS resources indicated in the RACH message. The RACH message may include a request for the UE to generate an L1 measurement report including a beam quality metrics measured based on the CSI-RSs across the plurality of beams. Resources for the transmission of the L1 measurement report may be indicated in the RACH message (e.g., a PDSCH of the RACH message 2). The UE may measure the beam quality metrics (e.g., RSRP or SINR) of one or more beams of the plurality of beams based on the CSI-RSs, generate the L1 measurement report including the beam quality metrics, and transmit the L1 measurement report to the base station. The UE may subsequently transmit a message 3 of a RACH procedure to the base station.

Figure 9:
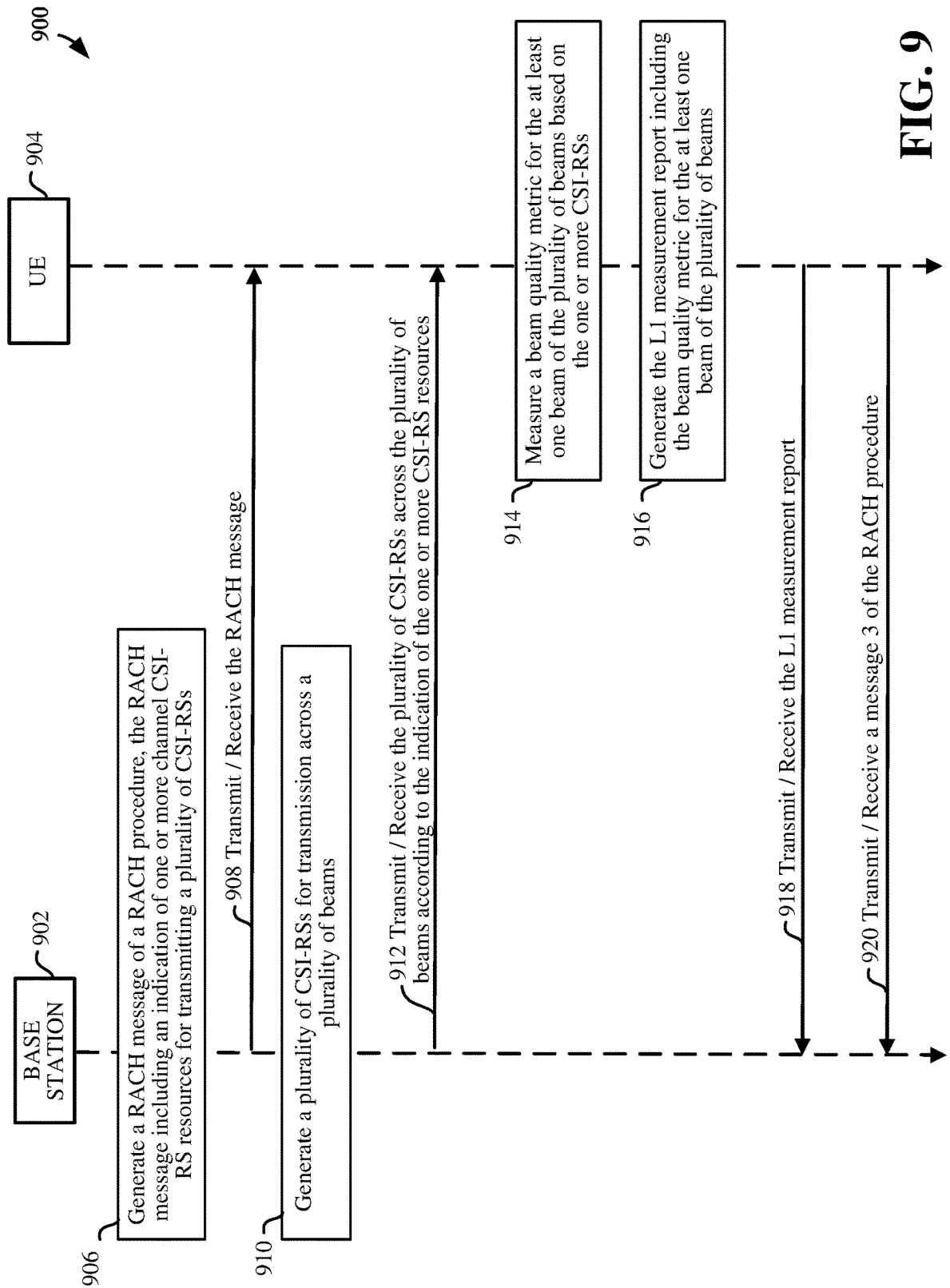
FIG. 9 is a signaling diagram illustrating an example for scheduling CSI-RS resources during a RACH procedure according to some aspects of the disclosure.

FIG. 9 is a signaling diagram illustrating an example for scheduling CSI-RS resources during a RACH procedure according to some aspects. In the example shown in FIG. 9, a base station 902 (e.g., a RAN node or scheduling entity) is in wireless communication with a UE 904 (e.g., a wireless communication device or scheduled entity) over an access link. The base station 902 may correspond to any of the scheduling entities or gNBs shown in FIGS. 1, 2, and 4-6. The UE 904 may correspond to any of the UEs, V2X devices, or D2D devices shown in FIGS. 1, 2, and 4-6.

At 906, the base station 902, which may be a transmitting wireless communication device, generates a RACH message of a RACH procedure. The RACH message may include a message 2 (e.g., a RAR) of the RACH procedure. For example, the base station 902 may have received a message 1 (e.g., a random-access request message) of the RACH procedure from the UE 904. The random-access request message (message 1) may include a preamble selected randomly by the UE 904 from a pool of preambles for contention-based random access. The message 1 may be transmitted on an SSB beam (receive beam) selected by the UE 904, as described above. Upon receiving the message 1 of the RACH procedure, the base station 902 can schedule CSI-RS resources for transmitting a plurality of CSI-RSs on a plurality of narrower beams (CSI-RS beams) to the UE. The CSI-RS beams may be within the same spatial direction as the SSB beam on which the message 1 was received. For example, the CSI-RS beams may be sub-beams of the SSB beam selected for message 1. The base station 902 may then generate the message 2 of the RACH procedure for transmission to the UE 904.

The RACH message may include an indication of the CSI-RS resources for transmitting the plurality of CSI-RSs. CSI-RSs, transmitted by the base station 902, may be used by the UE 904 to estimate a channel or beam and report channel or beam quality information back to the base station 902. For example, beam quality information may include a beam quality metric such as RSRP, SINR, or the like. The UE 904 may provide the base station 902 with the beam quality metric in an L1 measurement report.

In some aspects, the indication of the one or more CSI-RS resources may be transmitted on a PDCCH of the RACH message. For example, the indication of the one or more CSI-RS resources may be included in a PDCCH of a message 2 in a RACH procedure. The PDCCH of the RACH message may include DCI for indicating the CSI-RSs resources. In one example, the PDCCH of the RACH message may include DCI containing a bitfield indicating a transmission of a plurality of CSI-RSs during the RACH procedure. The PDCCH of the RACH message may further indicate the CSI-RS resources scheduled for transmission of the plurality of CSI-RSs in DCI based on scheduling information in the DCI scheduling resources for a PDSCH of the RACH message, predetermined rules associated with the scheduling information, or a bitfield contained in the DCI.

In some aspects, the PDCCH of the RACH message may further include DCI containing a bitfield indicating (e.g., requesting) that the UE 904 provides an L1 measurement report to the base station 902 in response to the UE 904 receiving the plurality of CSI-RSs. For example, the base station 902 may transmit a plurality of CSI-RSs to the UE 904, with each CSI-RS on a CSI-RS beam of a plurality of CSI-RS beams (e.g., beams in a spatial direction of the SSB beam used for message 1) for reception by the UE 904. Based on the bitfield contained in DCI of the PDCCH, the UE 904 may provide the base station with an L1 measurement report indicating one or more beam quality metrics each associated with each of the plurality of beams. In some examples, the base station 902 may receive the L1 measurement report from the UE 904 before the base station 902 receives a message 3 (e.g., a scheduled uplink transmission) of the RACH procedure from the UE 904. In this way, the base station 902 may select a beam (e.g., one of transmit beams 506a to 506h) for the reception of the message 3 based on the L1 measurement report.

In other examples, the indication of the one or more CSI-RS resources may be transmitted on a PDSCH of the RACH message. For example, the indication of the one or more CSI-RS resources may be transmitted in a PDSCH of a message 2 in the RACH procedure. The PDSCH of the RACH message may indicate one or more CSI-RS resources based on scheduling information in the PDSCH (e.g., first resources scheduled for the message 3), second resources utilized for the PDSCH, one or more predetermined rules associated with the first resources or the second resources, or a bitfield contained in the PDSCH.

In some aspects, the PDSCH of the RACH message may further include an indication of one or more resources (UL grant) for transmission by the UE 904 of an L1 measurement report including a beam quality metric of at least one beam of the plurality of beams. For example, the base station 902 may transmit a plurality of CSI-RSs to the UE 904, with each CSI-RS on a beam of a plurality of beams for reception by the UE 904. Based on the indication of one or more resources for an L1 measurement report in the PDSCH of the RACH message, the UE 904 may provide the base station with an L1 measurement report using the resources and indicating one or more beam quality metrics each associated with each of the plurality of beams. In some examples, the indication of the one or more resources for the L1 measurement report may be based on resources scheduled for the message 3 (e.g., a scheduled uplink transmission) of the RACH procedure, one more predetermined rules, or a bitfield contained in the PDSCH of the RACH message.

At 908, the base station 902 transmits the RACH message to the UE 904. For example, the RACH message may include the PDCCH of the RACH message 2 of the RACH procedure. The base station 902 may transmit the PDCCH of the RACH message to the UE to provide the UE with the indication of one or more CSI-RS resources for transmitting a plurality of CSI-RSs to the UE 904 and the request to provide the L1 measurement report, as described above.

In other examples, the RACH message may include the PDSCH of the RACH message in the RACH procedure. The base station 902 may transmit the PDSCH of the RACH message to the UE to provide the UE 904 with the indication of one or more CSI-RS resources for transmitting a plurality of CSI-RSs to the UE and the resource to use in transmitting an L1 measurement report, as described above.

At 910, the base station 902 generates a plurality of CSI-RSs for transmission across a plurality of beams (e.g., beams in the spatial direction of the SSB beam utilized for message 1). At 912, the base station 902 transmits the plurality of CSI-RSs across the plurality of beams according to the indication of the one or more CSI-RS resources. For example, the base station 902 may generate the plurality of CSI-RSs for transmission across the plurality of beams based on an indication of one or more CSI-RS resources transmitted by the base station 902 to the UE in the RACH message. In some aspects, for example, when the RACH message is a PDCCH of a RACH message in the RACH procedure, the base station 902 may transmit the CSI-RSs using the one or more CSI-RS resources to the UE 904 before transmitting a PDSCH of the RACH message to the UE 904. In some aspects, for example, when the RACH message is a PDCCH of a RACH message in the RACH procedure, the base station 902 may transmit the CSI-RSs using the one or more CSI-RS resources to the UE 904 before receiving a message 3 of the RACH procedure on a PUSCH from the UE 904. In some aspects, for example, when the RACH message is a PDSCH of a RACH message in the RACH procedure, the base station 902 may transmit the CSI-RSs using the one or more CSI-RS resources to the UE 904 before receiving a message 3 of the RACH procedure on a PUSCH from the UE 904.

At 914, the UE 904 measures a beam quality metric for the at least one beam of the plurality of beams based on the one or more CSI-RSs. For example, upon receiving the plurality of CSI-RSs on the plurality of beams, the UE 904 may measure a beam quality metric for at least one beam of the plurality of beams based on a CSI-RS. The beam quality metric may include at least one of reference signal received power (RSRP), signal-to-interference-plus-noise ratio (SINR), reference signal received quality (RSRQ), or like. At 916, the UE 904 generates the L1 measurement report including the beam quality metric for the at least one beam of the plurality of beams, and, at 918, transmits the L1 measurement report for reception by the base station 902. In some examples, the UE 904 transmits the L1 measurement report to the base station 902 before transmitting the message 3 of the RACH procedure.

In some examples, when the indication of the one or more CSI-RS resources is transmitted on a PDSCH of the RACH message, the PDSCH of the RACH message may also include an indication of one or more resources for an L1 measurement report including a beam quality metric of at least one beam of the plurality of beams. The UE 904 may transmit the L1 measurement report to the base station 902 using the one or more resources for the L1 measurement report provided in the PDSCH of the RACH message.

At 920, the UE 904 transmits a message 3 of the RACH procedure. For example, the UE 904 may transmit the message 3 of the RACH procedure over a PUSCH. Depending on the random access scenario, the message 3 of the RACH procedure may include an initial RRC connection setup message (e.g., carrying a non-stand-alone (NSA) UE ID message), an RRC connection reestablishment message (e.g., not carrying an NSA UE ID message), a handover message, or the like. In some aspects, the UE 904 may transmit the message 3 of the RACH procedure after receiving at least the PDCCH of the RACH message that includes the indication of the one or more CSI-RS resources for the transmission of the CSI-RSs on the plurality of beams from the base station to the UE. In some aspects, the UE 904 may transmit the message 3 of the RACH procedure after receiving at least the PDSCH of the RACH message that includes the indication of the one or more CSI-RS resources for the transmission of the CSI-RSs on the plurality of beams from the base station 902 to the UE 904. In some aspects, the UE 904 may transmit the message 3 of the RACH procedure after receiving the plurality of CSI-RSs on the plurality of beams from the base station 902. In some aspects, the UE 904 may transmit the message 3 of the RACH procedure after transmitting the L1 measurement report to the base station 902.

BS-Side Beam Refinement in a RACH Procedure without Explicit UE Report

In some aspects of the disclosure, a base station may be configured to transmit a plurality of reference signals (e.g., CSI-RSs) using a transmit beam that has been selected for communication with a UE (e.g., an SSB beam). In the following, examples are described that pertain to CSI-RS beam selection by a scheduling entity using CSI-RS without using CSI feedback. In particular, examples are described for CSI-RS beam selection within the same spatial direction of an SSB beam, but the UE does not send an explicit CSI-RS feedback report or measurement report (e.g., CQI) to the base station of the type described above in relation to FIG. 9. Rather, as will be explained, the base station can send information via message 2 that indicates to the UE the particular time resources (e.g., time slots) for transmissions by the UE within a PUSCH message 3 to provide signals for each of the CSI-RS beams to allow the base station to perform CSI-RS beam refinement and select a particular transmit beam (e.g., SSB beam).

In some aspects, the base station can provide the message 2 information (that indicates the particular time resources for the PUSCH message 3) to the UE within the data payload of a PDSCH. Since the amount of bit-space available within the PDSCH payload may be relatively large, the PDSCH may explicitly schedule the time resources of the PUSCH message 3 corresponding to each of the CSI-RS beams. Alternatively, the PDSCH payload information (that indicates the particular time resources for the PUSCH message 3) may be used in conjunction with one or more predetermined rules (e.g., standards-based rules) that govern the communication between the UE and base station. For example, the PDSCH payload information may identify a particular rule that both the UE and the base station are programmed to follow (e.g., by the OEM). In some aspects, the predetermined rule may specify that the time resources depend on the best CSI-RS beam selected by the UE. For example, at least one time resource of message 3 is associated with at least one CSI-RS beam of a plurality of CSI-RS beams measured by the UE.

Still further, in some aspects, the base station can provide information within message 2 that schedules the CSI-RS transmissions so that the UE can properly detect the transmissions. In some aspects, the base station schedules CSI-RS using the DCI of a PDCCH. Since the amount of bit-space available within a DCI may be limited, the scheduling information may be provided within a small bit field (e.g., two bits of the DCI) that provides pointers or indexes for indicating a particular predetermined rule, for example, rules specified in a standards document (e.g., 3GPP Specification) for scheduling CSI-RS. The rule may specify, for example, the timing of a particular sequence of CSI-RS for one or more beams (e.g., different CSI-RS beams in a spatial direction of an SSB beam). In other examples, the base station can provide the message 2 scheduling information that schedules CSI-RS within the data payload of a PDSCH (e.g., the time and frequency resources for CSI-RS are explicitly indicated in the payload). Since, as noted, the amount of bit-space available within the PDSCH payload may be relatively large, the information of the PDSCH may explicitly schedule the CSI-RS for each of the CSI-RS beams.

Figure 10:
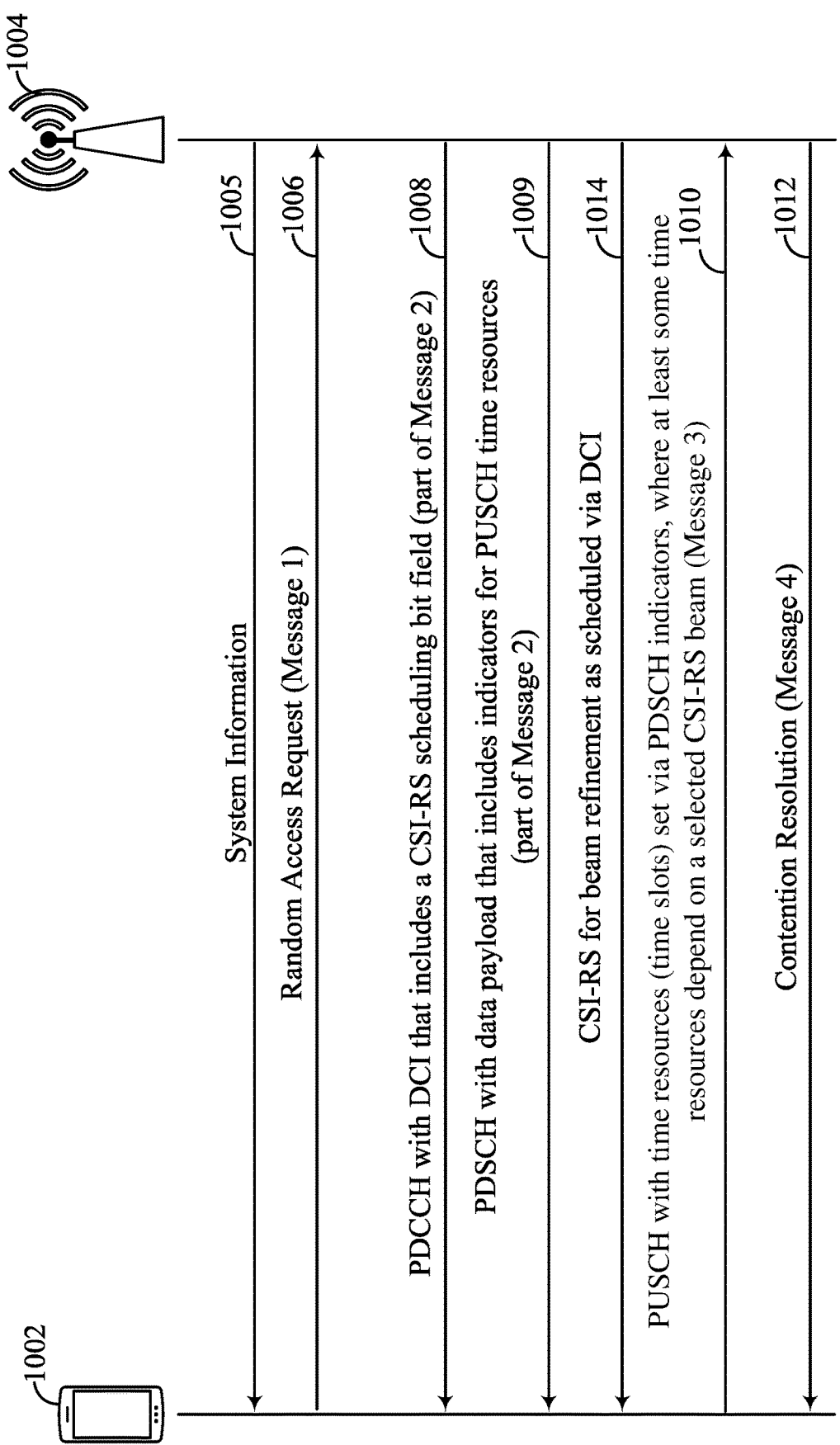
FIG. 10 is a signaling diagram illustrating an exemplary RACH procedure using base station side beam refinement according to some aspects of the disclosure.

FIG. 10 is a diagram illustrating an exemplary random access procedure according to some aspects of the disclosure. In the example shown in FIG. 10, a UE 1002 (e.g., a wireless communication device or scheduled entity) is in wireless communication with a base station 1004 (e.g., a RAN node or scheduling entity) over an access link. The base station 1004 may correspond to any of the scheduling entities or gNBs shown in FIGS. 1, 2, and 4-6. The UE 1002 may correspond to any of the UEs, V2X devices, or D2D devices shown in FIGS. 1,2, and 4-6.

In this example, message 2 PDCCH includes DCI that schedules the CSI-RS for beam refinement, and the message 2 PDSCH includes information indicating the time resources of the message 3 PUSCH to use. The UE selects the time resources of the message 3 based on the best CSI-RS beam selected by the UE based on CSI-RS measurements of the plurality of CSI-RS beams. A UE 1002 may attempt to connect to a base station 1004 using an initial access procedure (e.g., a RACH procedure of FIG. 6). After the UE 1002 receives and decodes system information 1005 (e.g., SSB, SIB1) from the base station 1004, the UE may identify a random access search space including PRACH resources for initiating a RACH procedure from the SIB1. In one example, to initiate a RACH procedure, the UE 1002 transmits a random access request 1006 (message 1) associated with the RACH procedure to the scheduling entity 1004.

The base station may acknowledge the random access request 1006 by transmitting a RAR 1008 (message 2) associated with the RACH procedure. In the example of FIG. 10, a message 2 includes two portions: a PDCCH and a PDSCH. The PDCCH includes DCI that includes a CSI-RS scheduling bit field that schedules subsequent CSI-RS transmissions. The bit field, for example, may include two bits that provide pointers (e.g., indexes) to a four-entry table stored in the UE that specifies four predetermined rules for the scheduling of the CSI-RS transmissions. In some aspects, the predetermined rules may be specified in a standards document, such as a 3GPP specification document, and pre-configured on the UE by the OEM. The base station can have access to a same or similar table with pointers to the same predetermined rules. The predetermined rules may be embodied as hardware, software, and/or firmware programs within both the UE and the base station. In this manner, the base station can inform the UE which scheduling rule (e.g., one of the predetermined rules) to follow so that both the base station (e.g., gNB), and the UE may follow the same rule. In some examples, the DCI may specify a single rule using a single bit that indicates whether the rule is to be followed or not. In such a case, the bit notifies the UE that CSI-RS is employed. In still other examples, three or more bits may be used to indicate a particular one of a larger number of predetermined rules for scheduling CSI-RS. By providing one or more bits within the DCI that serve as pointers to rules (or preprogrammed procedures), the bit field of the DCI can implicitly or indirectly schedule the CSI-RS.

In the example of FIG. 10, the PDSCH portion 1009 of message 2 can include indicators within its data payload that can indicate to the UE the time resources (e.g., time slots) to use for message 3 of PUSCH. As noted, in the example of FIG. 10, no CSI-RS feedback reports, such as CQI reports, are explicitly and separately sent from the UE to the base station. Rather, the UE transmits signals back to the base station using various time slots of the PUSCH that correspond to the various CSI-RS beams. These PUSCH transmissions may be regarded as an alternate form of CSI-RS feedback. In some examples, the PUSCH transmissions are transmitted by the UE using the same gain and are thus received by the base station with differing gains depending upon the particular CSI-RS beam used. As such, the base station can assess which CSI-RS beam is best for further transmissions. In other examples, the PUSCH transmissions might include information indicative of signal strength measured by the UE for the various CSI-RS beams.

Since there is a relatively large amount of bit-space available within the payload of PDSCH, the base station may explicitly or directly specify within the payload the time resources of the PUSCH for the UE to use for message 3. In some aspects, the PDSCH includes indicators that control the UE to use a specified time slot for use with the best or preferred CSI-RS beams (as measured by the UE) and to then follow a predetermined rule that specifies the time resources within consecutive uplink time slots of the PUSCH for each of the other CSI-RS beams. In this manner, at least one time resource of the PUSCH message 3 will be associated with at least one CSI-RS beam of a set of CSI-RS beams measured by the UE. In other aspects, the PDSCH can include indicators that control the UE to use specified time slots for each of the CSI-RS beams. In this example, the UE can determine the time slots associated with each CSI-RS beam based on the PDSCH indicators. In some aspects, one or more parameters may be used along with indicator bits for scheduling the PUSCH time resources.

In the example of FIG. 10, since the PDCCH DCI has relatively little space available for additional information (beyond what is already specified in standards documents), the aforementioned bit field of the DCI is used for CSI-RS scheduling, rather than PUSCH time resource scheduling. However, in other examples, the DCI may additionally or alternatively include PUSCH time resource scheduling indictors. As can be appreciated, numerous variations to the illustrative examples described herein are possible, depending on the resources available.

At 1014, the base station transmits the CSI-RS on a plurality of CSI-RS beams to allow the UE to receive and measure the CSI-RS and select a best (or strongest or otherwise optimal or preferred) CSI-RS beam. As already explained, the CSI-RS transmissions are scheduled in this example via the DCI of PDCCH of message 2 and so the UE knows the schedule of the transmissions and can control its transceiver accordingly to sense and process the signals. For example, the UE can measure the quality of the CSI-RSs and select a better or preferred CSI-RS beam.

At 1010, the UE transmits a message 3 PUSCH with at least some of the time resources (e.g., time slots) set via the PDSCH indicators, as already explained, wherein at least some of the time resources depend on a selected CSI-RS beam. The UE can select the PUSCH time resources corresponding to the best transmit beam based on measurements of the reference signals (CSI-RSs).

Thereafter, contention resolution may be attempted at 1012, as already discussed. For example, the UE can start monitoring for a contention resolution message 1012 (also known as message 4) on a PDSCH to complete the RACH procedure.

Figure 11:
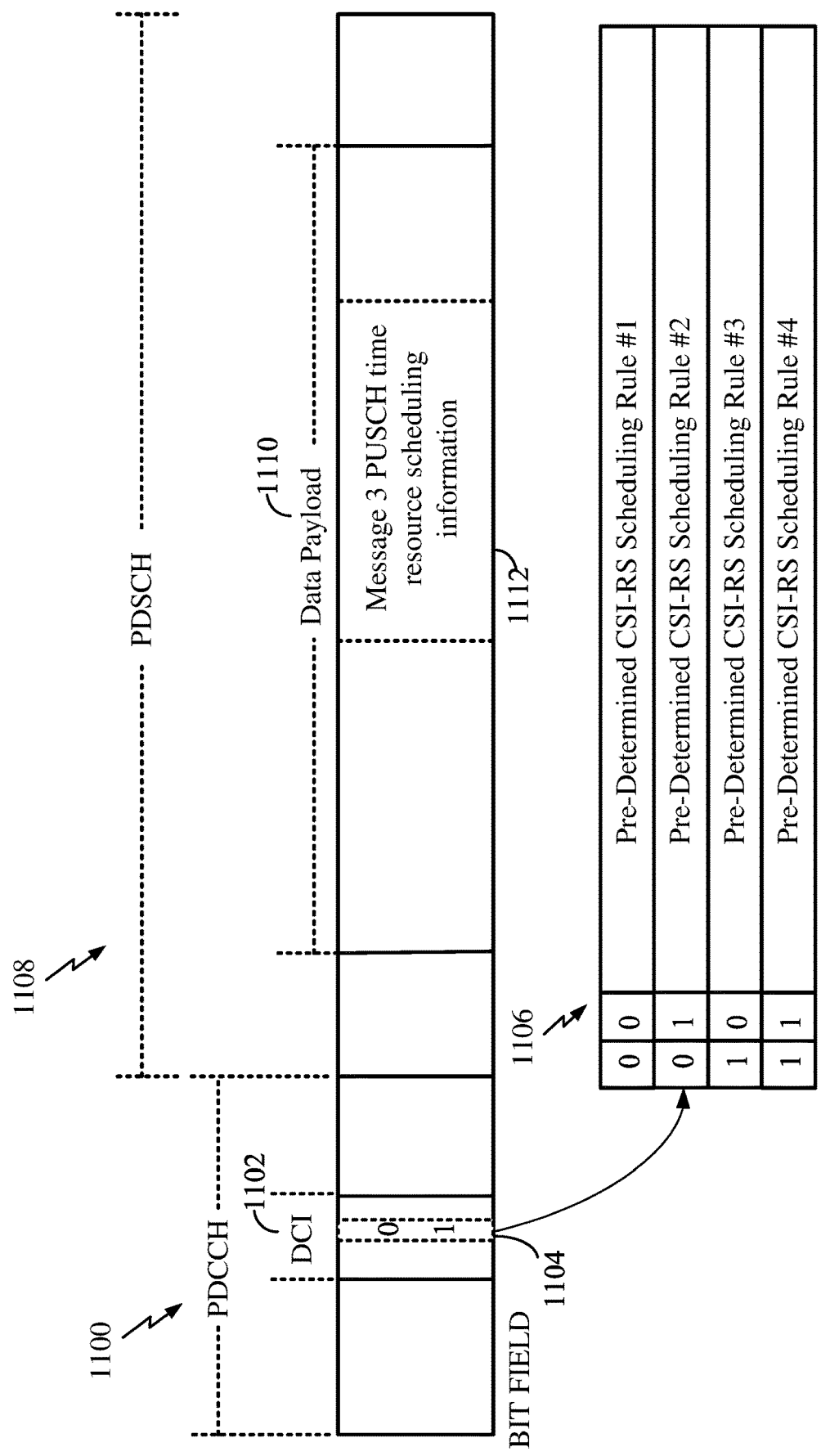
FIG. 11 is a diagram illustrating downlink control information (DCI) with a bit field for providing pointers to predetermined CSI-RS scheduling rules according to some aspects of the disclosure.

FIG. 11 illustrates a PDCCH 1100 having a DCI 1102 that includes a bit field 1104 that provides the aforementioned pointers to a table 1106 within the UE, where the table associates the bit field pointers (e.g., indexes) to predetermined CSI-RS scheduling rules or procedures. In the particular example of FIG. 11, the bit field 1104 of the DCI is a two-bit field with the bits set to [0,1]. This particular bit combination can point to the second row of the table 1106, which identifies a second pre-determined CSI-RS scheduling rule. In some examples, the pre-determined rules may be specified in a standards document and encoded or embodied within the UE within hardware, software, and/or firmware (e.g., by the OEM). The base station can include a similar table corresponding to the same rules. Note that the DCI and the PDCCH may include additional fields and information not shown in the figure. Moreover, the fields of the PDCCH are not shown to scale.

FIG. 11 additionally illustrates a PDSCH 1108 having a data payload 1110 that indicates available PUSCH time resources, and the UE can select one of the PUSCH resources associated with the CSI-RS beam selected based on CSI-RS measurement. For example, the data payload 1110 can include message 3 PUSCH time resource scheduling information 1112 that indicates the time resources (e.g., time slots) for use by the UE to transmit PUSCH for facilitating the CSI-RS beam selection based on the association of the PUSCH time resources and CSI-RS beams. As already explained, since there is a relatively large amount of space available in the payload of the PDSCH, the time resources may be explicitly or directly specified in the PDSCH. Alternatively, the PDSCH payload may instead provide bit field pointers that point to a table (similar to table 1106) that lists pre-determined PUSCH time resource scheduling rules specified in a standards document and encoded or embodied within the UE hardware, software, and/or firmware (e.g., by the OEM). In some aspects, the PDSCH may include additional fields and information not shown in the figure. Moreover, the fields of the PDSCH are not shown to scale.

Figure 12:
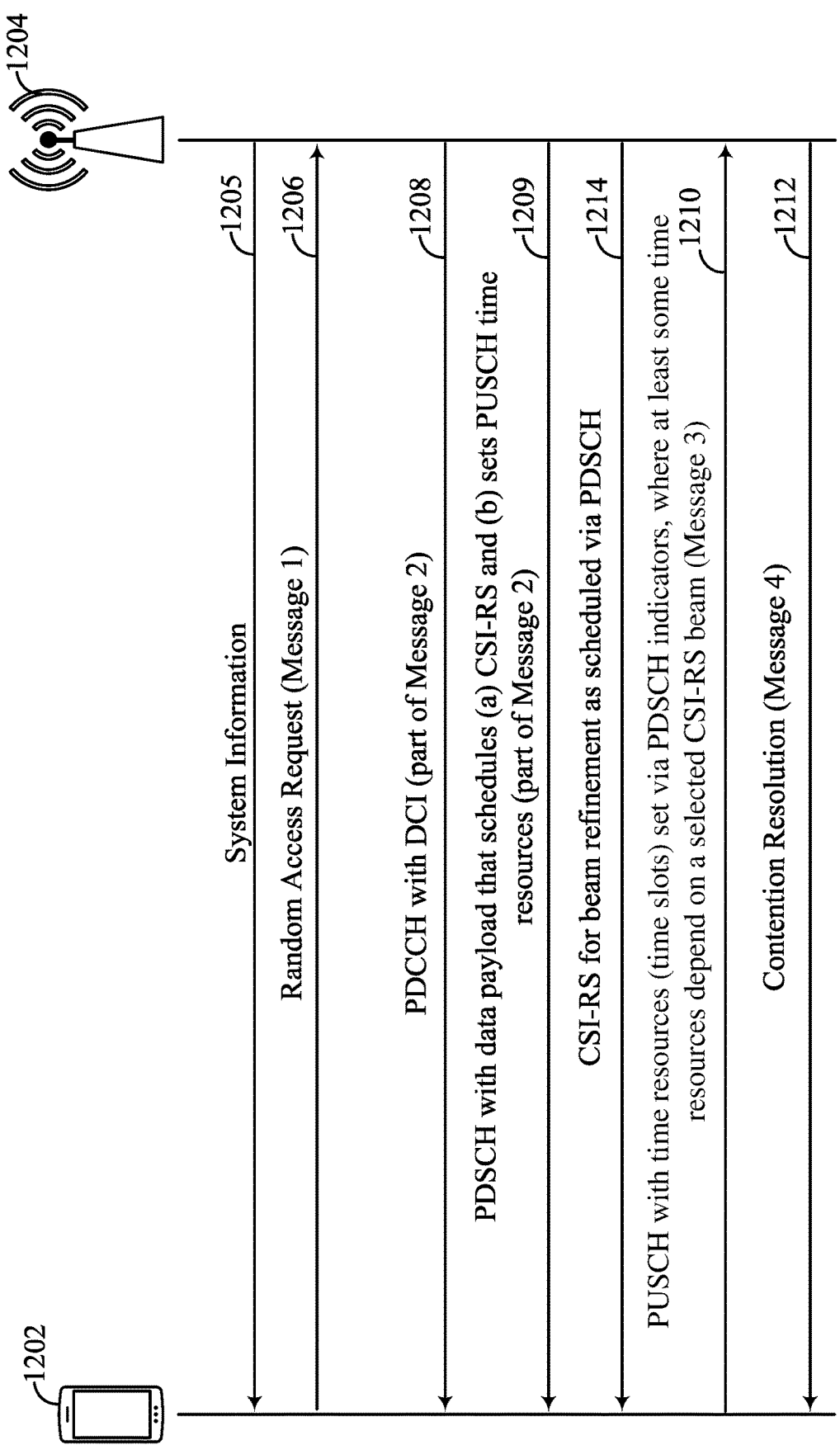
FIG. 12 is a diagram illustrating an exemplary RACH procedure using base station side beam refinement without UE feedback according to some aspects of the disclosure

FIG. 12 is a diagram illustrating an exemplary random access procedure according to some aspects of the disclosure. In the example shown in FIG. 12, a UE 1202 (e.g., a wireless communication device or scheduled entity) is in wireless communication with a base station 1204 (e.g., a RAN node or scheduling entity) over an access link. The base station 1204 may correspond to any of the scheduling entities or gNBs shown in FIGS. 1, 2, and 4-6. The UE 1202 may correspond to any of the UEs, V2X devices, or D2D devices shown in FIGS. 1, 2, and 4-6.

In this example, message 2 PDSCH includes data payload information that schedules the CSI-RSs and also includes the information indicating the time resources of the message 3 PUSCH. The UE can select the message 3 PUSCH time resources depending on a best or preferred CSI-RS beam selected by the UE based on the CSI-RS measurements. As described with FIGS. 6 and 10, a UE 1202 may attempt to connect to a base station 1204 using an initial access procedure (e.g., a RACH procedure). After the UE receives and decodes system information 1205 (e.g., SSB, SIB1) from the base station, the UE may identify a random access search space including PRACH resources for initiating a RACH procedure from the SIB1. In one example, to initiate a RACH procedure, the UE 1202 transmits a random access request 1206 (message 1) associated with the RACH procedure to the base station 1204.

The base station 1204 may acknowledge the random access request 1206 by transmitting a RAR 1208 (message 2) associated with the RACH procedure. In the example of FIG. 12, message 2 includes two portions: a PDCCH portion and a PDSCH portion. The PDCCH 1208 may include various types of DCI that, unlike the example of FIG. 11 described above, does not schedule CSI-RS. In this case, the PDSCH 1209 can include CSI-RS scheduling information within its data payload that schedules the CSI-RS transmissions and include indicators that indicate to the UE the time resources (e.g., time slots) to use for message 3 of PUSCH. In this example, no CSI-RS feedback is explicitly and separately sent from the UE to the base station. Rather, the UE transmits signals (e.g., message 3) back to the base station using the time slots of the PUSCH that correspond to the CSI-RS beam selected based on CSI-RS measurements. The base station can determine the selected CSI-RS beam based on the resources used for the PUSCH. Since there is a relatively large amount of bit-space available with the payload of PDSCH, the base station can explicitly or directly specify both (a) the CSI-RS transmission scheduling information and (b) the time resources of the PUSCH for the UE to use. In some aspects, the PDSCH includes indicators that specify the time slot or resources for a particular CSI-RS beam (e.g., the best or preferred CSI-RS beam as measured or selected by the UE), and the UE can follow a predetermined rule to determine the PUSCH resources (e.g., within consecutive uplink time slots of the PUSCH) for the other CSI-RS beams. In other aspects, the PDSCH includes indicators that control the UE to use specified time slots for each of the CSI-RS beams (e.g., no predetermined rules are employed). In some aspects, one or more parameters may be used along with indicator bits for scheduling the CSI-RS and the PUSCH time resources.

At 1214, the base station transmits the CSI-RS for each of the set of CSI-RS beams (e.g., beams in a spatial direction of the previously selected SSB beam) to allow the UE to receive and measure the CSI-RSs and selects a best (or strongest or otherwise optimal) CSI-RS beam. As already explained, the CSI-RS transmissions are scheduled in this example via the PDSCH of message 2 and so the UE knows the schedule of the transmissions and can control its transceiver accordingly to sense and process the signals.

At 1210, the UE transmits a message 3 PUSCH using at least some of the time resources (e.g., time slots) set via the PDSCH indicators of message 2 as explained above. In this case, at least some of the time resources depend on a CSI-RS beam (message 3) selected by the UE. For example, after the UE selects a CSI-RS beam based on CSI-RS measurements, the UE can select the PUSCH time resources associated with the selected CSI-RS beam based on the PDSCH indicators.

Thereafter, contention resolution may be attempted at 1212, as already discussed above in relation to FIG. 11.

Figure 13:
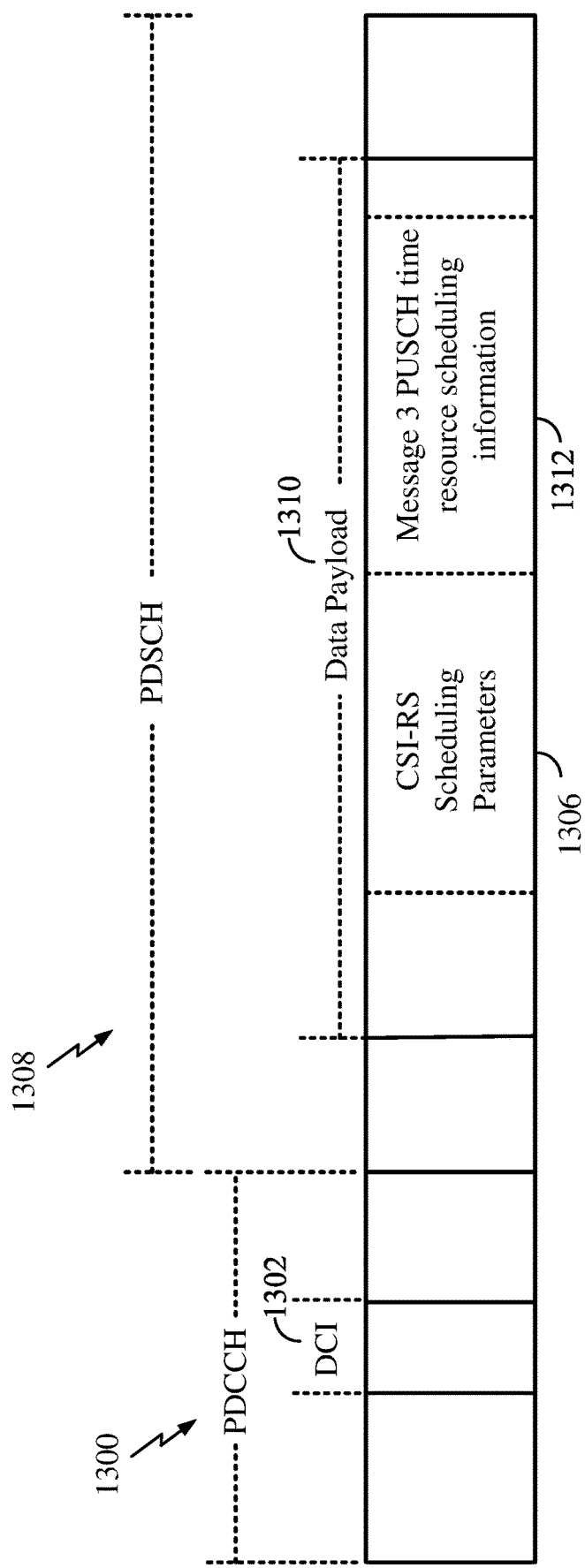
FIG. 13 is a diagram illustrating an example of providing CSI-RS scheduling information in the data payload of a physical downlink shared channel (PDSCH) according to some aspects of the disclosure.

FIG. 13 illustrates a PDCCH 1300 having a DCI 1302 that, unlike the DCI of FIG. 11, does not include a bit field with pointers to a table of predetermined CSI-RS scheduling rules or procedures. Rather, the particular rule to be applied for scheduling the CSI-RSs is specified within a portion 1306 of the data payload 1310 of the PDSCH 1308. For example, the PDSCH data payload 1310 may include various parameters that specify the respective time and frequency of each CSI-RS in a sequence of CSI-RS (each associated with a different CSI-RS beam). Therefore, the UE can directly determine the resources for receiving the CSI-RSs from the PDSCH data. FIG. 13 additionally illustrates a second payload portion 1312 that includes the message 3 PUSCH time resource scheduling information indicating the time resources (e.g., time slots) for use by the UE to transmit signals (PUSCH) to the base station for the various CSI-RS beams. Note that both the PDCCH and the PDSCH may include additional fields and information not shown in the figure. Moreover, the fields of the PDCCH and the PDSCH are not shown to scale.

Figure 14:
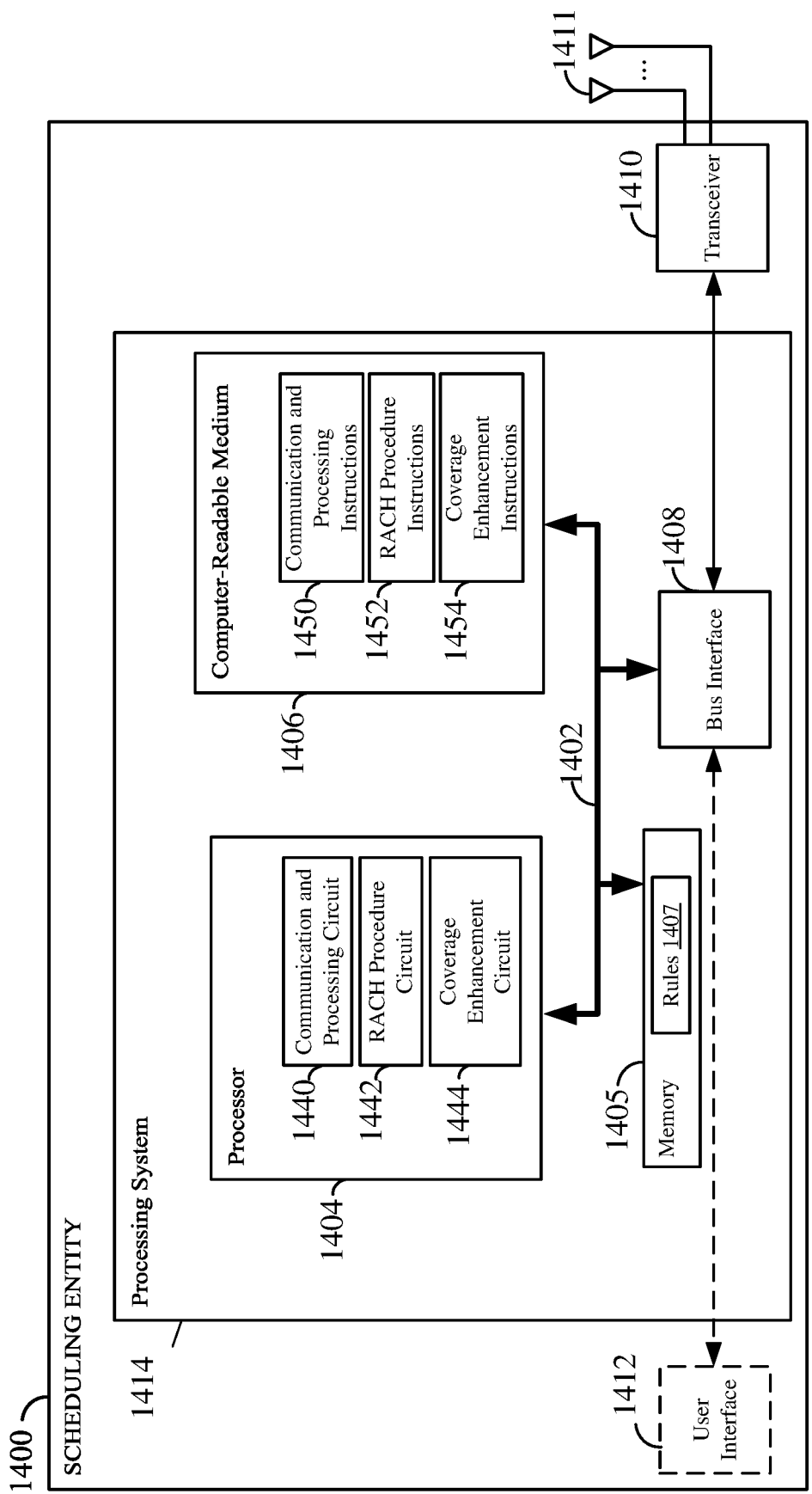
FIG. 14 is a block diagram illustrating an example of a hardware implementation for a scheduling entity according to some aspects of the disclosure.

FIG. 14 is a block diagram illustrating an example of a hardware implementation for a scheduling entity 1400 employing a processing system 1414. For example, the scheduling entity 1400 may be a base station as illustrated in any one or more of FIGS. 1, 2, 4-6, 9, 10, and/or 12.

The scheduling entity 1400 may be implemented with a processing system 1414 that includes one or more processors 1404. Examples of processors 1404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1400 may be configured to perform any one or more of the functions described herein. That is, the processor 1404, as utilized in a scheduling entity 1400, may be used to implement any one or more of the processes and procedures described and illustrated in FIGS. 6-13, 16, and 17.

The processor 1404 may in some instances be implemented via a baseband or modem chip and in other implementations, the processor 1404 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1414 may be implemented with a bus architecture, represented generally by the bus 1402. The bus 1402 may include any number of interconnecting buses and bridges depending on the specific application of the processing system 1414 and the overall design constraints. The bus 1402 communicatively couples together various circuits including one or more processors (represented generally by the processor 1404), a memory 1405, and computer-readable media (represented generally by the computer-readable medium 1406). The bus 1402 may also link various other circuits such as timing sources, peripherals, voltage regulators, and power management circuits, which are well known in the art, and therefore, will not be described any further. A bus interface 1408 provides an interface between the bus 1402 and a transceiver 1410. The transceiver 1410 and antennas 1411 provide a communication interface or means for communicating with various other apparatus over a transmission medium. For example, the transceiver 1410 and antennas 1411 can be configured to perform beamforming functions. Depending upon the nature of the apparatus, a user interface 1412 (e.g., keypad, display, speaker, microphone, joystick) may also be provided. Of course, such a user interface 1412 is optional, and may be omitted in some examples, such as a base station.

The processor 1404 is responsible for managing the bus 1402 and general processing, including the execution of software stored on the computer-readable medium 1406. The software, when executed by the processor 1404, causes the processing system 1414 to perform the various functions described below for any particular apparatus. The computer-readable medium 1406 and the memory 1405 may also be used for storing data that is manipulated by the processor 1404 when executing software. For example, the data may include predetermined scheduling rules 1407 used in a RACH procedure described herein.

One or more processors 1404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1406. The computer-readable medium 1406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1406 may reside in the processing system 1414, external to the processing system 1414, or distributed across multiple entities including the processing system 1414. The computer-readable medium 1406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1404 may include circuitry configured for various functions, including, for example, coverage enhancement in a RACH procedure. In some aspects of the disclosure, the processor 1404 may include communication and processing circuitry 1440 configured for various functions, including for example communicating with a network core (e.g., a 5G core network), scheduled entities (e.g., UE), or any other entity, such as, for example, local infrastructure or an entity communicating with the scheduling entity 1400 via the Internet, such as a network provider. In some examples, the communication and processing circuitry 1440 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1440 may include one or more transmit/receive chains. In addition, the communication and processing circuitry 1440 may be configured to receive and process uplink traffic and uplink control messages (e.g., similar to uplink traffic 116 and uplink control 118 of FIG. 1), transmit and process downlink traffic and downlink control messages (e.g., similar to downlink traffic 112 and downlink control 114). The communication and processing circuitry 1440 may further be configured to execute communication and processing software 1450 stored on the computer-readable medium 1406 to implement one or more functions described herein.

In some implementations where the communication involves receiving information, the communication and processing circuitry 1440 may obtain information from a component of the wireless communication device 1400 (e.g., from the transceiver 1410 that receives the information via radio frequency signaling or some other type of signaling suitable for the applicable communication medium), process (e.g., decode) the information, and output the processed information. For example, the communication and processing circuitry 1440 may output the information to another component of the processor 1404, to the memory 1405, or to the bus interface 1408. In some examples, the communication and processing circuitry 1440 may receive one or more of signals, messages, other information, or any combination thereof. In some examples, the communication and processing circuitry 1440 may receive information via one or more channels. In some examples, the communication and processing circuitry 1440 may include functionality for a means for receiving. In some examples, the communication and processing circuitry 1440 may include functionality for a means for processing, including a means for demodulating, a means for decoding, etc.

In some implementations where the communication involves sending (e.g., transmitting) information, the communication and processing circuitry 1440 may obtain information (e.g., from another component of the processor 1404, the memory 1405, or the bus interface 1408), process (e.g., modulate, encode, etc.) the information, and output the processed information. For example, the communication and processing circuitry 1440 may output the information to the transceiver 1410 (e.g., that transmits the information via radio frequency signaling or some other type of signaling suitable for the applicable communication medium). In some examples, the communication and processing circuitry 1440 may send one or more of signals, messages, other information, or any combination thereof. In some examples, the communication and processing circuitry 1440 may send information via one or more channels. In some examples, the communication and processing circuitry 1440 may include functionality for a means for sending (e.g., a means for transmitting). In some examples, the communication and processing circuitry 1440 may include functionality for a means for generating, including a means for modulating, a means for encoding, etc.

In some aspects of the disclosure, the processor 1404 may include RACH procedure circuitry 1442 that can be configured to perform various functions used in a random access procedure (e.g., RACH procedure). In some examples, the RACH procedure circuitry 1442 may include one or more hardware components that provide the physical structure that performs processes related to a RACH procedure. In some examples, the RACH procedure circuitry 1442 can process, transmit, and receive RACH messages (e.g., message 1, message 2, message 3, and message 4) via the transceiver 1410 and antennas 1411. The RACH procedure circuitry 1442 may further be configured to execute RACH procedure software 1452 stored on the computer-readable medium 1406 to implement one or more functions described herein.

In some aspects of the disclosure, the processor 1404 may include a coverage enhancement circuitry 1444 that can be configured to perform various functions to facilitate coverage enhancement in a RACH procedure. In some examples, the coverage enhancement circuitry 1444 may include one or more hardware components that provide the physical structure that performs processes related to coverage enhancement (e.g., beam refinement). In some examples, the coverage enhancement circuitry 1444 can configure, schedule, and provide reference signals (e.g., CSI-RSs) for enabling UE-side beam refinement and/or BS beam refinement in a RACH procedure. The coverage enhancement circuitry 1444 may further be configured to execute coverage enhancement software 1454 stored on the computer-readable medium 1406 to implement one or more functions described herein.

Figure 15:
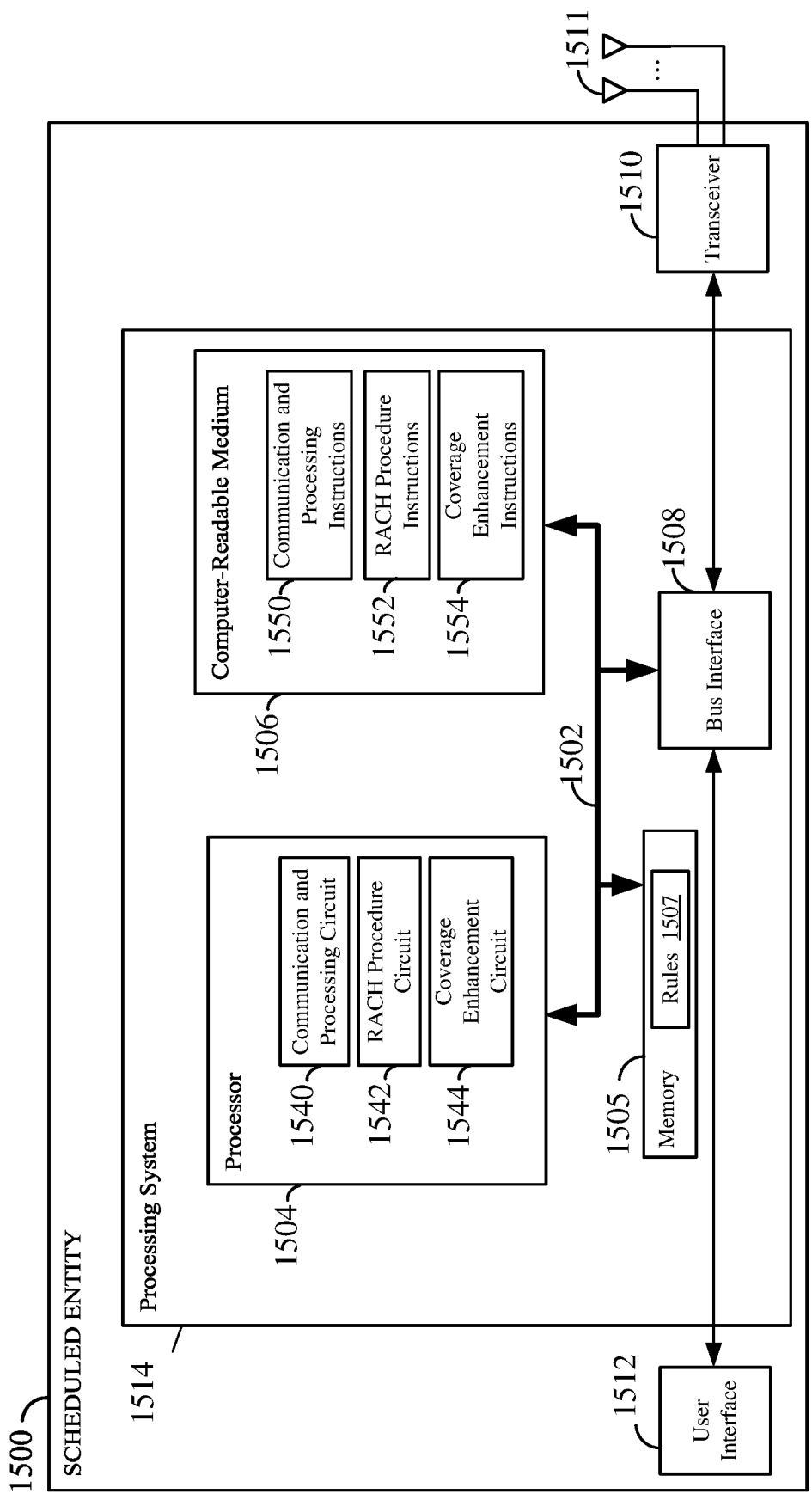
FIG. 15 is a block diagram illustrating an example of a hardware implementation for a scheduled entity according to some aspects of the disclosure.

FIG. 15 is a conceptual diagram illustrating an example of a hardware implementation for an exemplary user equipment (UE) 1500 employing a processing system 1514. In accordance with various aspects of the disclosure, an element, or any portion of an element, or any combination of elements may be implemented with a processing system 1514 that includes one or more processors 1504. For example, the UE 1500 may be a UE as illustrated in any one or more of FIGS. 1, 2, 4-6, 9, 10, and/or 12.

The processing system 1514 may be substantially the same as the processing system 1414 illustrated in FIG. 14, including a bus interface 1508, a bus 1502, memory 1505, a processor 1504, and a computer-readable medium 1506. Furthermore, the UE 1500 may include a user interface 1512 and a transceiver 1510 substantially similar to those described above in FIG. 14. That is, the processor 1504, as utilized in a UE 1500, may be used to implement any one or more of the processes described and illustrated in FIGS. 6-13, 18, and 19.

In some aspects of the disclosure, the processor 1504 may include circuitry configured for various functions, including, for example, coverage enhancement in a RACH procedure. In some aspects of the disclosure, the processor 1504 may include communication and processing circuitry 1540 configured for various functions, including for example communicating with a scheduling entity (e.g., base station or gNB). In some examples, the communication and processing circuitry 1540 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1540 may include one or more transmit/receive chains. In addition, the communication and processing circuitry 1540 may be configured to transmit and process uplink traffic and uplink control messages (e.g., similar to uplink traffic 116 and uplink control 118 of FIG. 1), receive and process downlink traffic and downlink control messages (e.g., similar to downlink traffic 112 and downlink control 114). The communication and processing circuitry 1540 may further be configured to execute communication and processing software 1550 stored on the computer-readable medium 1506 to implement one or more functions described herein.

In some aspects of the disclosure, the processor 1504 may include RACH procedure circuitry 1542 that can be configured to perform various functions used in a random access procedure (e.g., RACH procedure). In some examples, the RACH procedure circuitry 1542 may include one or more hardware components that provide the physical structure that performs processes related to a RACH procedure. For example, the RACH procedure circuitry 1542 can process, transmit, and receive RACH messages (e.g., message 1, message 2, message 3, and message 4) via the transceiver 1510 and antennas 1511. The RACH procedure circuitry 1542 may further be configured to execute RACH procedure software 1552 stored on the computer-readable medium 1506 to implement one or more functions described herein.

In some aspects of the disclosure, the processor 1504 may include a coverage enhancement circuitry 1544 that can be configured to perform various functions to facilitate coverage enhancement in a RACH procedure. In some examples, the coverage enhancement circuitry 1544 may include one or more hardware components that provide the physical structure that performs processes related to coverage enhancement (e.g., beam refinement) in a RACH procedure. In some examples, the memory 1505 may store predetermined rules 1507 that can be used for coverage enhancement in a RACH procedure described herein. In some examples, the coverage enhancement circuitry 1544 can process and measures CSI-RSs for enabling UE-side beam refinement and/or BS-side beam refinement in a RACH procedure. The coverage enhancement circuitry 1544 may further be configured to execute coverage enhancement software 1554 stored on the computer-readable medium 1506 to implement one or more functions described herein.

Figure 16:
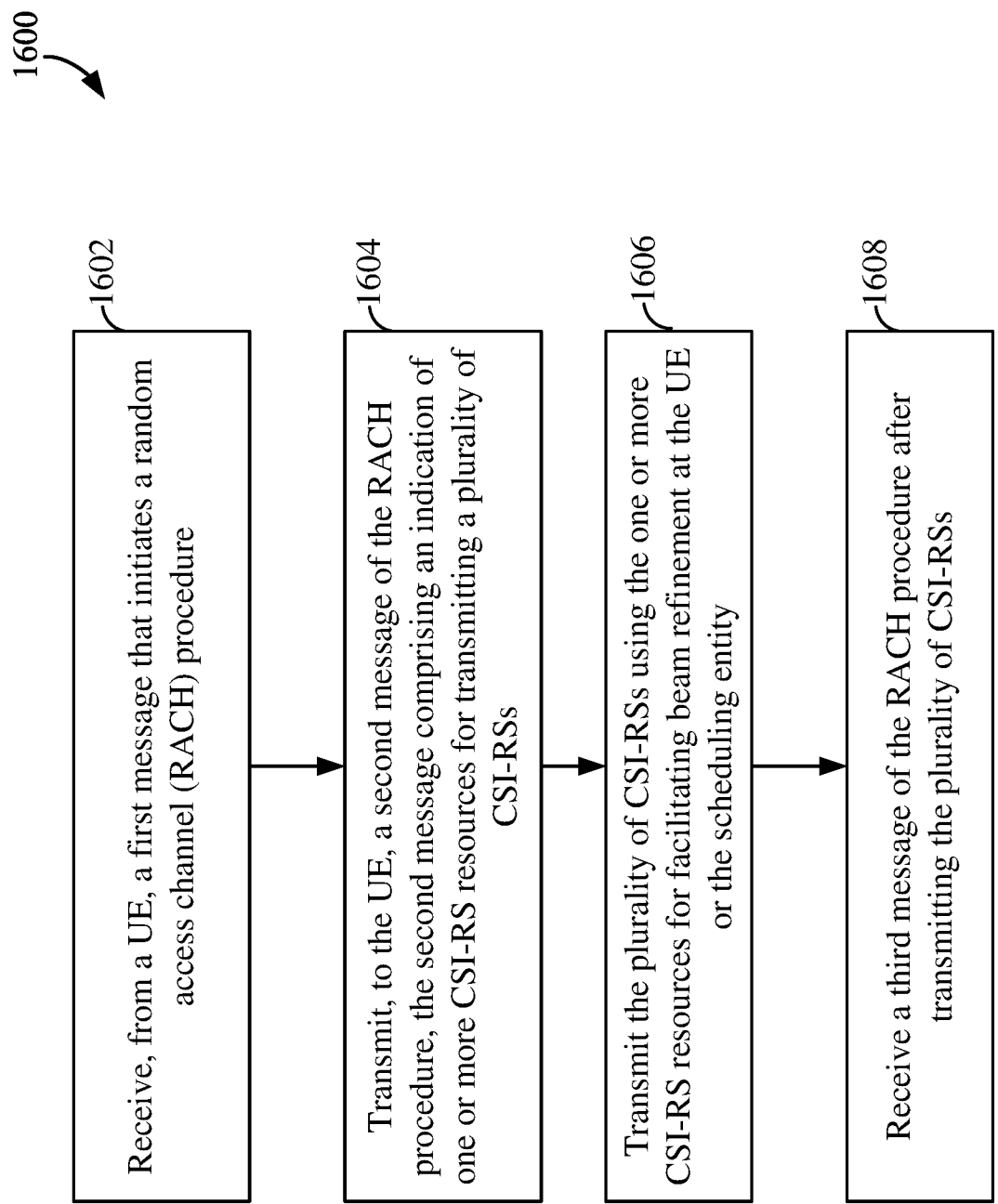
FIG. 16 is a flow chart illustrating an exemplary RACH procedure at a scheduling entity using coverage enhancement techniques according to some aspects of the disclosure.

FIG. 16 is a flow chart illustrating an exemplary RACH procedure 1600 at a scheduling entity using coverage enhancement techniques according to some aspects of the disclosure. As described below, some or all illustrated features may be omitted in a particular implementation within the scope of the present disclosure, and some illustrated features may not be required for implementation of all examples. In some examples, the RACH procedure 1600 may be carried out by the scheduling entity 1400 illustrated in FIG. 14. In some examples, the RACH procedure 1600 may be carried out by any suitable apparatus or means for carrying out the functions or algorithm described below.

At block 1602, a scheduling entity (e.g., a gNB or base station) can receive a first message of a RACH procedure from a UE. The first message can initiate the RACH procedure. In one example, the communication and processing circuitry 1440 may provide a means to receive the first message via the transceiver 1410 and antennas 1411. In one example, the first message may be a random access request (e.g., message 1) that includes a PRACH preamble. The RACH procedure circuitry 1442 can provide a means to process the first message received by the communication and processing circuitry 1440.

At block 1604, the scheduling entity can transmit a second message of the RACH procedure to the UE. The second message can include an indication of one or more CSI-RS resources for transmitting a plurality of CSI-RSs. The CSI-RSs can enable UE-side beam refinement or BS-side beam refinement in the RACH procedure. In one example, the RACH procedure circuitry 1442 may provide a means to provide the indication of the CSI-RS resources (e.g., time, frequency, and spatial resources). In some aspects, the second message may be a message 2 (e.g., RAR 608 of FIG. 6) of the RACH procedure. The PUCCH and/or PDSCH of message 2 may provide the indication of the CSI-RS resources. In some aspects, the resources (e.g., PDCCH and/or PDSCH resources) used for transmitting the message 2 can indicate, with or without the DCI, the CSI-RS resources based on a predetermined rule (e.g., rules 1407) that associates the message 2 resources and the CSI-RS resources. In some aspects, the communication and processing circuitry 1440 may provide a means to transmit the second message via the transceiver 1410 and antennas 1411. In one example, the scheduling entity may transmit the CSI-RSs as repetition of k subsets of CSI-RSs on k OFDM symbols on the same CSI-RS beam. In one example, the scheduling entity may transmit the CSI-RSs on a plurality of CSI-RS beams (e.g., beams in a spatial direction of an SSB beam that has been used for communication with the UE).

At block 1606, the scheduling entity can transmit the plurality of CSI-RSs using the one or more CSI-RS resources to facilitate beam refinement at the UE or the scheduling entity. For UE-side beam refinement, the scheduling entity can transmit the CSI-RSs using a same transmit beam. For BS-side beam refinement, the scheduling entity can transmit the CSI-RSs using a plurality of beams, for example, CSI-RS beams (e.g., beams in a spatial direction of an SSB beam that has been used for the first or second message. In one example, the communication and processing circuitry 1440 may provide a means to transmit the CSI-RSs or reference signals via the transceiver 1410 and antennas 1411 using one or more transmit beams (e.g., CSI-RS beams) to enable UE-side and/or BS-side beam refinement. In one example, the one or more transmit beams may be one or more of the transmit beams 506a to 506h described above in relation to FIG. 5.

At block 1608, the scheduling entity can receive a third message of the RACH procedure from the UE after transmitting the plurality of CSI-RSs. The communication and processing circuitry 1440 may provide a means to receive the third message via the transceiver 1410 and antennas 1411. In one example, the scheduling entity may receive the third message (message 3) that is transmitted by the UE using a receive beam (e.g., receive beams 508a-508e of FIG. 5). In one aspect, the UE can select the receive beam based on the measurements of the CSI-RSs transmitted on one or more transmit beams. In one example, the third message may be an RRC Connection Request 610 (message 3) of a RACH procedure.

In some aspects, the scheduling entity can transmit the second message using DCI/PUCCH or PDSCH. In one example, the scheduling entity can transmit DCI on a PDCCH, and the DCI includes the indication of the one or more CSI-RS resources. In one example, the scheduling entity can transmit the indication of the one or more CSI-RS resources in PDSCH payload data.

In one aspect, the indication can indicate the one or more CSI-RS resources based on scheduling information in the DCI for scheduling the one or more CSI-RS resources. In one aspect, the indication can indicate the one or more CSI-RS resources based on one or more predetermined rules (e.g., rules 1407) associated with resources used to transmit the PDCCH. In one aspect, the indication can indicate the one or more CSI-RS resources based on a bitfield contained in the DCI configured to indicate one or more predetermined rules (e.g., rules 1407) associated with the one or more CSI-RS resources.

In one aspect, the indication can indicate the one or more CSI-RS resources based on scheduling information in the PDSCH for scheduling the one or more CSI-RS resources. In one aspect, the indication can indicate the one or more CSI-RS resources based on first communication resources used for transmitting the PDSCH. In one aspect, the indication can indicate the one or more CSI-RS resources based on second communication resources scheduled for receiving the third message of the RACH procedure. In one aspect, the indication can indicate the one or more CSI-RS resources based on one or more predetermined rules (e.g., rules 1407) associated with the first communication resources or the second communication resources. In one aspect, the indication can indicate the one or more CSI-RS resources based on a bitfield contained in the PDSCH configured to indicate one or more predetermined rules (e.g., rules 1407) associated with the one or more CSI-RS resources.

Figure 17:
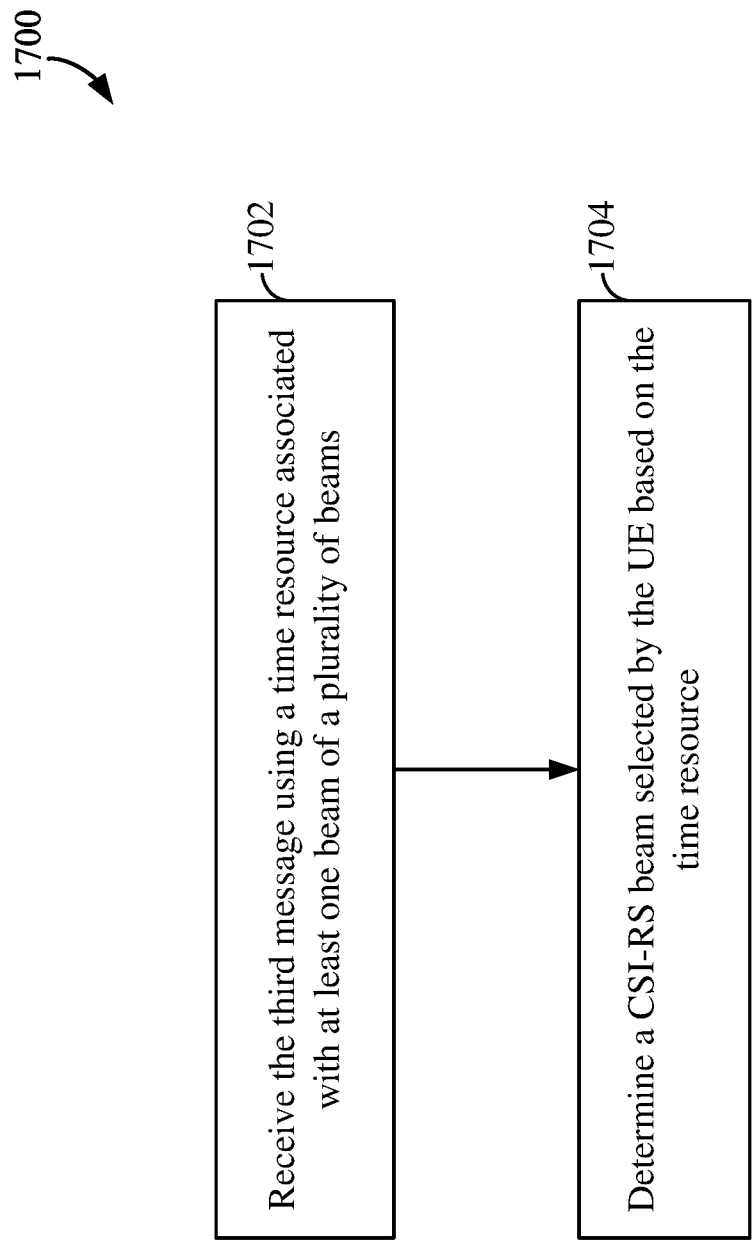
FIG. 17 is a flow chart illustrating a process for determining a CSI-RS beam selected by a UE according to some aspects of the disclosure.

FIG. 17 is a flow chart illustrating a process 1700 for determining a CSI-RS beam selected by a UE in some aspects of the disclosure. In some examples, the process 1700 may be carried out by the scheduling entity 1400 illustrated in FIG. 14. In some examples, the process 1700 may be carried out by any suitable apparatus or means for carrying out the functions or algorithm described below. At block 1702, a scheduling entity can receive a third message (e.g., the third message described in block 1608 of FIG. 16) using a time resource associated with at least one beam of a plurality of beams. For example, the third message may be a PUSCH (Message 3) as described above in any of FIGS. 9-13. In one aspect, the plurality of beams may be CSI-RS beams measured by the UE based on CSI-RSs transmitted by the scheduling entity. At block 1704, the scheduling can determine the CSI-RS beam selected the UE based on the time resource used for receiving the third message (e.g., PUSCH).

Figure 18:
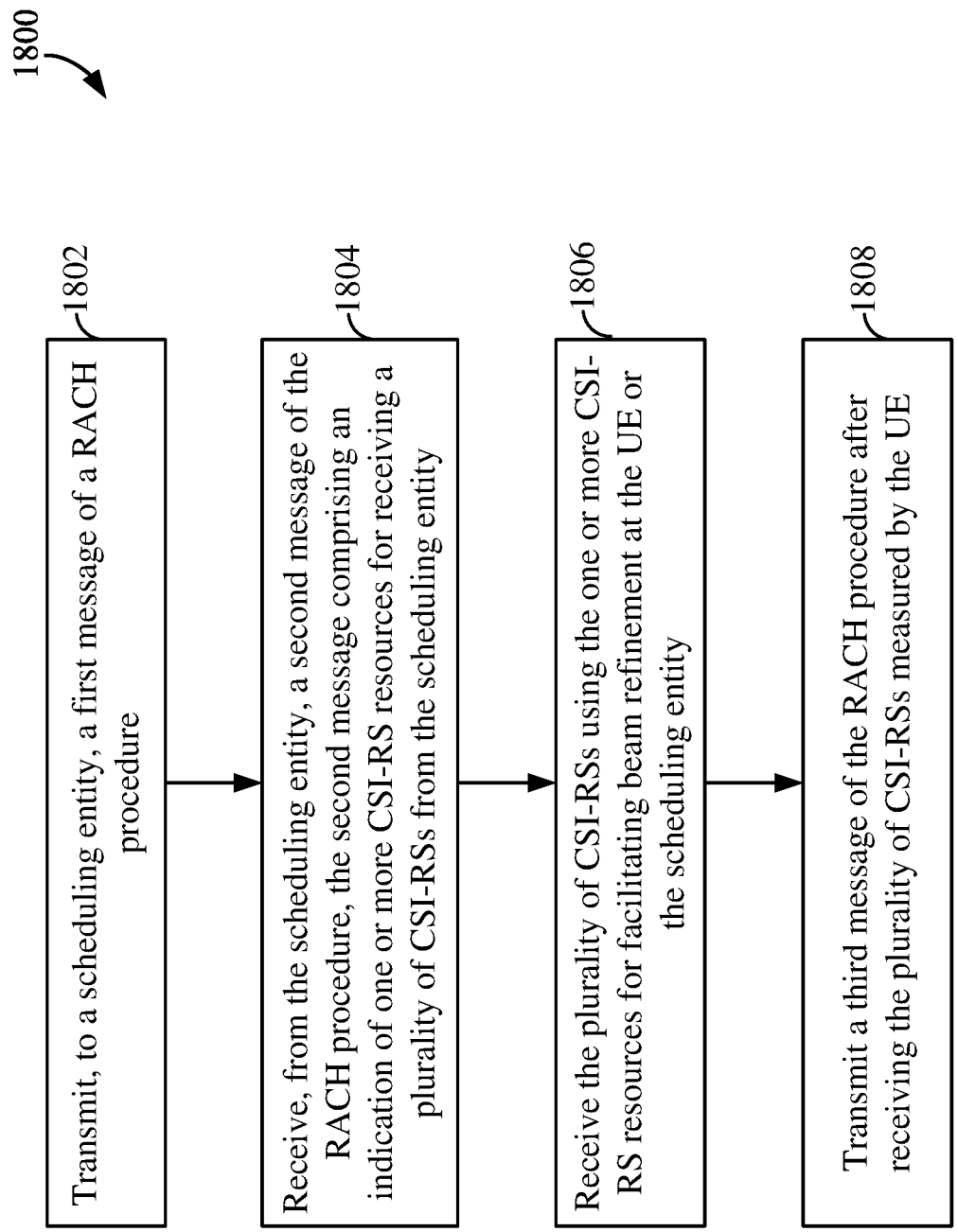
FIG. 18 is a flow chart illustrating an exemplary RACH procedure at a user equipment using coverage enhancement techniques according to some aspects of the disclosure.

FIG. 18 is a flow chart illustrating an exemplary RACH procedure 1800 at a UE using coverage enhancement techniques according to some aspects of the disclosure. As described below, some or all illustrated features may be omitted in a particular implementation within the scope of the present disclosure, and some illustrated features may not be required for the implementation of all examples. In some examples, the RACH procedure 1800 may be carried out by the UE 1500 illustrated in FIG. 15. In some examples, the RACH procedure 1800 may be carried out by any suitable apparatus or means for carrying out the functions or algorithm described below.

At block 1802, the UE can transmit a first message to a scheduling entity (e.g., gNB or base station). The first message can initiate a random access channel (RACH) procedure. In one example, the communication and processing circuitry 1540 may provide a means to transmit the first message via the transceiver 1510 and antennas 1511. In one example, the first message may be a random access request (e.g., message 1) that includes a PRACH preamble. The RACH procedure circuitry 1542 can provide a means to process the first message to be transmitted by the communication and processing circuitry 1540.

At block 1804, the UE can receive a second message of the RACH procedure from the scheduling entity. The second message can include an indication of one or more CSI-RS resources for receiving a plurality of CSI-RSs from the scheduling entity. The CSI-RSs can enable a UE-side beam refinement procedure or a BS-side beam refinement procedure in the RACH procedure. In one example, the communication and processing circuitry 1540 may provide a means to receive the second message of the RACH procedure via the transceiver 1510 and antennas 1511. In some aspects, the second message may be the message 2 (e.g., RAR 608 of FIG. 6) of the RACH procedure. The message 2 PUCCH and/or PDSCH may provide the indication of the CSI-RS resources. In some aspects, the resources (e.g., PDCCH and/or PDSCH resources) used for transmitting the message 2 can indicate, with or without the DCI, the CSI-RS resources based on a predetermined rule (e.g., rule 1507) that associates the message 2 resources and the CSI-RS resources. In some aspects, the RACH procedure circuitry 1542 may provide a means to process the indication to determine the CSI-RS resources.

In one aspect, the UE can receive DCI on a PDCCH, and the DCI includes the indication of the one or more CSI-RS resources. In one aspect, the UE can receive the indication of the one or more CSI-RS resources on a PDSCH. In one aspect, the indication can indicate the one or more CSI-RS resources based on scheduling information in the DCI for scheduling the one or more CSI-RS resources. In one aspect, the indication can indicate the one or more CSI-RS resources based on one or more predetermined rules associated with resources used to receive the PDCCH. In one aspect, the indication can indicate the one or more CSI-RS resources based on a bitfield contained in the DCI configured to indicate one or more predetermined rules associated the one or more CSI-RS resources.

In one aspect, the indication can indicate the one or more CSI-RS resources based on scheduling information in the PDSCH for scheduling the one or more CSI-RS resources. In one aspect, the indication can indicate the one or more CSI-RS resources based on first communication resources used for receiving the PDSCH. In one aspect, the indication can indicate the one or more CSI-RS resources based on second communication resources scheduled for transmitting the third message of the RACH procedure. In one aspect, the indication can indicate the one or more CSI-RS resources based on one or more predetermined rules associated with the first communication resources or the second communication resources. In one aspect, the indication can indicate the one or more CSI-RS resources based on a bitfield contained in the PDSCH configured to indicate one or more predetermined rules associated the one or more CSI-RS resources.

At block 1806, the UE can receive the plurality of CSI-RSs using the one or more CSI-RS resources for facilitating beam refinement at the UE or the scheduling entity. In one example, the communication and processing circuitry 1540 may provide a means to receive the plurality of CSI-RSs via the transceiver 1510 and antennas 1511 from one or more transmit beams (e.g., e.g., CSI-RS beams) of the scheduling entity. In some aspects, the UE can receive and measure the CSI-RSs across one or more receive beams (e.g., receive beams 508a to 508e in FIG. 5).

In one aspect, the UE can receive the plurality of CSI-RSs from a same transmit beam of the scheduling entity and determine respective quality of the plurality of CSI-RSs corresponding to a plurality of receive beams of the UE. Then, the UE can select one of the plurality of receive beams for communicating with the scheduling entity based on the determined quality of the plurality of CSI-RSs.

At block 1808, the UE can transmit a third message of the RACH procedure after receiving the plurality of CSI-RSs measured by the UE. In one example, the communication and processing circuitry 1540 may provide a means to transmit the third message via the transceiver 1510 and antennas 1511. In one example, the UE may transmit the third message using a receive beam that is selected based on the measurements of the CSI-RSs. In one example, the third message may an RRC Connection Request 610 (message 3) of a RACH procedure.

In one aspect, the second message includes DCI containing a bitfield indicating that the UE provides an L1 measurement report in response to the plurality of CSI-RSs. To that end, the UE measures a beam quality metric for at least one beam of a plurality of transmit beams from the scheduling entity based on the one or more CSI-RSs. Then the UE can transmit the L1 measurement report to the scheduling entity, and the L1 measurement report includes the beam quality metric of the at least one beam of the plurality of transmit beams.

Figure 19:
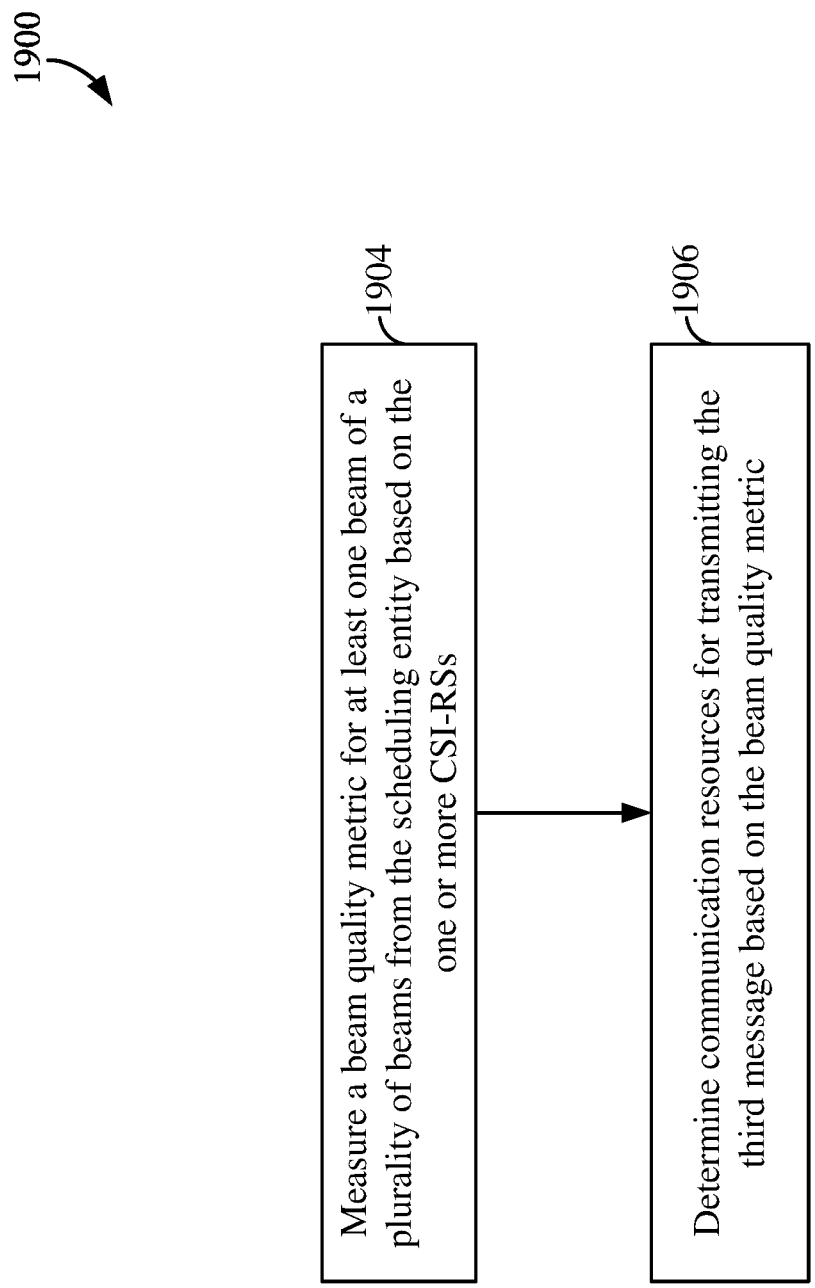
FIG. 19 is a flow chart illustrating a process for selecting resources of a RACH third message based on CSI-RS measurements according to some aspects of the disclosure.

FIG. 19 is a flow chart illustrating a process for selecting resources of a RACH third message based on CSI-RS measurements according to some aspects of the disclosure. In some examples, the process 1900 may be carried out by the scheduled entity 1500 illustrated in FIG. 15. At block 1902, the UE can measure a beam quality metric for at least one beam of a plurality of beams (e.g., CSI-RS beams) from the scheduling entity based on the one or more CSI-RSs. At 1906, the UE determines communication resources for transmitting the third message based on the beam quality metric. For example, the UE can select the time resources of the message 3 associated with a best CSI-RS beam selected by the UE based on the beam quality metric.

In a first aspect of the disclosure, a user equipment (UE) for wireless communication is provided. The UE comprises: a transceiver for wireless communication; a memory; and a processor coupled with the transceiver and the memory, wherein the processor and the memory are configured to: transmit, to a scheduling entity, a first message that initiates a random access channel (RACH) procedure; receive, from the scheduling entity, a second message of the RACH procedure, the second message comprising an indication of one or more channel state information reference signal (CSI-RS) resources for receiving a plurality of CSI-RSs from the scheduling entity; receive the plurality of CSI-RSs using the one or more CSI-RS resources for facilitating beam refinement at the UE or the scheduling entity; and transmit a third message of the RACH procedure after receiving the plurality of CSI-RSs measured by the UE.

In a second aspect, alone or in combination with the first aspect, wherein to receive the second message, the processor and the memory are further configured to: receive downlink control information (DCI) on a physical download control channel (PDCCH), the DCI comprising the indication of the one or more CSI-RS resources; or receive, on a physical downlink shared channel (PDSCH), the indication of the one or more CSI-RS resources.

In a third aspect, alone or in combination with the second aspect, wherein the indication is configured to indicate the one or more CSI-RS resources based on at least one of: scheduling information in the DCI for scheduling the one or more CSI-RS resources; one or more predetermined rules associated with resources used to receive the PDCCH; or a bitfield contained in the DCI configured to indicate one or more predetermined rules associated the one or more CSI-RS resources.

In a fourth aspect, alone or in combination with the second aspect, wherein the indication is configured to indicate the one or more CSI-RS resources based on at least one of: scheduling information in the PDSCH for scheduling the one or more CSI-RS resources; first communication resources used for receiving the PDSCH; second communication resources scheduled for transmitting the third message of the RACH procedure; one or more predetermined rules associated with the first communication resources or the second communication resources; or a bitfield contained in the PDSCH configured to indicate one or more predetermined rules associated the one or more CSI-RS resources.

In a fifth aspect, alone or in combination with any of the first to fourth aspects, wherein the processor and the memory are further configured to: receive the plurality of CSI-RSs from a same beam of the scheduling entity; determine respective quality of the plurality of CSI-RSs corresponding to a plurality of receive beams of the UE; and select one of the plurality of receive beams for communicating with the scheduling entity based on the determined quality of the plurality of CSI-RSs.

In a sixth aspect, alone or in combination with any of the first to fourth aspects, wherein the second message comprises DCI containing a bitfield indicating that the UE provides a Layer 1 (L1) measurement report in response to the plurality of CSI-RSs, and further comprising: measuring a beam quality metric for at least one beam of a plurality of beams from the scheduling entity based on the one or more CSI-RSs, and transmitting the L1 measurement report to the scheduling entity, the L1 measurement report comprising the beam quality metric of the at least one beam of the plurality of beams.

In a seventh aspect, alone or in combination with any of the first to fourth aspects, wherein the processor and the memory are further configured to: measure a beam quality metric for at least one beam of a plurality of beams from the scheduling entity based on the one or more CSI-RSs, and determine communication resources for transmitting the third message based on the beam quality metric.

In an eighth aspect, a method for wireless communication at a user equipment (UE) is provided. The method comprises: transmitting, to a scheduling entity, a first message that initiates a random access channel (RACH) procedure; receiving, from the scheduling entity, a second message of the RACH procedure, the second message comprising an indication of one or more channel state information reference signal (CSI-RS) resources for receiving a plurality of CSI-RSs from the scheduling entity; receiving the plurality of CSI-RSs using the one or more CSI-RS resources for facilitating beam refinement at the UE or the scheduling entity; and transmitting a third message of the RACH procedure after receiving the plurality of CSI-RSs measured by the UE.

In a ninth aspect, alone or in combination with the eighth aspect, wherein receiving the second message comprises: receiving downlink control information (DCI) on a physical download control channel (PDCCH), the DCI comprising the indication of the one or more CSI-RS resources; or receiving, on a physical downlink shared channel (PDSCH), the indication of the one or more CSI-RS resources.

In a tenth aspect, alone or in combination with the ninth aspect, wherein the indication is configured to indicate the one or more CSI-RS resources based on at least one of: scheduling information in the DCI for scheduling the one or more CSI-RS resources; one or more predetermined rules associated with resources used to receive the PDCCH; or a bitfield contained in the DCI configured to indicate one or more predetermined rules associated the one or more CSI-RS resources.

In an eleventh aspect, alone or in combination with the ninth aspect, wherein the indication is configured to indicate the one or more CSI-RS resources based on at least one of: scheduling information in the PDSCH for scheduling the one or more CSI-RS resources; first communication resources used for receiving the PDSCH; second communication resources scheduled for transmitting the third message of the RACH procedure; one or more predetermined rules associated with the first communication resources or the second communication resources; or a bitfield contained in the PDSCH configured to indicate one or more predetermined rules associated the one or more CSI-RS resources.

In a twelfth aspect, alone or in combination with any of the ninth to eleventh aspects, the method further comprises: receiving the plurality of CSI-RSs from a same beam of the scheduling entity; determining respective quality of the plurality of CSI-RSs corresponding to a plurality of receive beams of the UE; and selecting one of the plurality of receive beams for communicating with the scheduling entity based on the determined quality of the plurality of CSI-RSs.

In a thirteenth aspect, alone or in combination with any of the ninth to eleventh aspects, wherein the second message comprises DCI containing a bitfield indicating that the UE provides a Layer 1 (L1) measurement report in response to the plurality of CSI-RSs, and the method further comprises:

measuring a beam quality metric for at least one beam of a plurality of beams from the scheduling entity based on the one or more CSI-RSs, and transmitting the L1 measurement report to the scheduling entity, the L1 measurement report comprising the beam quality metric of the at least one beam of the plurality of beams.

In a fourteenth aspect, alone or in combination with any of the ninth to eleventh aspects, the method further comprises: measuring a beam quality metric for at least one beam of a plurality of beams from the scheduling entity based on the one or more CSI-RSs, and determining communication resources for transmitting the third message based on the beam quality metric.

In a fifteenth aspect, a scheduling entity for wireless communication is provided. The scheduling entity comprises: a transceiver for wireless communication; a memory; and a processor coupled with the transceiver and the memory, wherein the processor and the memory are configured to: receive, from a user equipment (UE), a first message that initiates a random access channel (RACH) procedure; transmit, to the UE, a second message of the RACH procedure, the second message comprising an indication of one or more channel state information reference signal (CSI-RS) resources for transmitting a plurality of CSI-RSs; transmit the plurality of CSI-RSs using the one or more CSI-RS resources for facilitating beam refinement at the UE or the scheduling entity; and receive a third message of the RACH procedure after transmitting the plurality of CSI-RSs.

In a sixteenth aspect, alone or in combination with the fifteenth aspect, wherein to transmit the second message, the processor and the memory are further configured to: transmit downlink control information (DCI) on a physical download control channel (PDCCH), the DCI comprising the indication of the one or more CSI-RS resources; or transmit, on a physical downlink shared channel (PDSCH), the indication of the one or more CSI-RS resources.

In a seventeenth aspect, alone or in combination with the sixteenth aspect, wherein the indication is configured to indicate the one or more CSI-RS resources based on at least one of: scheduling information in the DCI for scheduling the one or more CSI-RS resources; one or more predetermined rules associated with resources used to transmit the PDCCH; or a bitfield contained in the DCI configured to indicate one or more predetermined rules associated the one or more CSI-RS resources.

In an eighteenth aspect, alone or in combination with the sixteenth aspect, wherein the indication is configured to indicate the one or more CSI-RS resources based on at least one of: scheduling information in the PDSCH for scheduling the one or more CSI-RS resources; first communication resources used for transmitting the PDSCH; second communication resources scheduled for receiving the third message of the RACH procedure; one or more predetermined rules associated with the first communication resources or the second communication resources; or a bitfield contained in the PDSCH configured to indicate one or more predetermined rules associated the one or more CSI-RS resources.

In a nineteenth aspect, alone or in combination with any of the fifteenth to eighteenth aspects, wherein the processor and the memory are further configured to: transmit the plurality of CSI-RSs in a same beam of the scheduling entity, wherein the second message comprises a field indicating that the plurality of CSI-RSs are not associated with a feedback report.

In a twentieth aspect, alone or in combination with any of the fifteenth to eighteenth aspects, wherein the second message comprises DCI containing a bitfield indicating that the UE provides a Layer 1 (L1) measurement report in response to the plurality of CSI-RSs, and further comprising: receiving a Layer (L1) measurement report from the UE, the L1 measurement report comprising a beam quality metric of at least one beam of a plurality of beams of the scheduling entity based on the one or more CSI-RSs.

In a twenty-first aspect, alone or in combination with any of the fifteenth to eighteenth aspects, wherein to receive the third message, the processor and the memory are further configured to: receive the third message using a time resource associated with at least one beam of a plurality of beams of the scheduling entity measured by the UE using the plurality of CSI-RSs.

In a twenty-second aspect, a method of wireless communication at a scheduling entity, the method comprises: receiving, from a user equipment (UE), a first message that initiates a random access channel (RACH) procedure; transmitting, to the UE, a second message of the RACH procedure, the second message comprising an indication of one or more channel state information reference signal (CSI-RS) resources for transmitting a plurality of CSI-RSs to the UE; transmitting the plurality of CSI-RSs using the one or more CSI-RS resources for facilitating beam refinement at the UE or the scheduling entity; and receiving a third message of the RACH procedure after transmitting the plurality of CSI-RSs.

In a twenty-third aspect, alone or in combination with the twenty-second aspect, wherein the transmitting the second message comprises: transmitting downlink control information (DCI) on a physical download control channel (PDCCH), the DCI comprising the indication of the one or more CSI-RS resources; or transmitting, on a physical downlink shared channel (PDSCH), the indication of the one or more CSI-RS resources.

In a twenty-fourth aspect, alone or in combination with the twenty-third aspect, wherein the indication is configured to indicate the one or more CSI-RS resources based on at least one of: scheduling information in the DCI for scheduling the one or more CSI-RS resources; one or more predetermined rules associated with resources used to transmit the PDCCH; or a bitfield contained in the DCI configured to indicate one or more predetermined rules associated the one or more CSI-RS resources.

In a twenty-fifth aspect, alone or in combination with the twenty-third aspect, wherein the indication is configured to indicate the one or more CSI-RS resources based on at least one of: scheduling information in the PDSCH for scheduling the one or more CSI-RS resources; first communication resources used for transmitting the PDSCH; second communication resources scheduled for receiving the third message of the RACH procedure; one or more predetermined rules associated with the first communication resources or the second communication resources; or a bitfield contained in the PDSCH configured to indicate one or more predetermined rules associated the one or more CSI-RS resources.

In a twenty-sixth aspect, alone or in combination with any of the twenty-second to twenty-fifth aspects, the method further comprises: transmitting the plurality of CSI-RSs in a same beam of the scheduling entity, wherein the second message comprises a field indicating that the plurality of CSI-RSs are not associated with a feedback report.

In a twenty-seventh aspect, alone or in combination with any of the twenty-second to twenty-fifth aspects, wherein the second message comprises DCI containing a bitfield indicating that the UE provides a Layer 1 (L1) measurement report in response to the plurality of CSI-RSs, and the method further comprises: receiving a Layer (L1) measurement report from the UE, the L1 measurement report comprising a beam quality metric of at least one beam of a plurality of beams of the scheduling entity based on the one or more CSI-RSs.

In a twenty-eighth aspect, alone or in combination with any of the twenty-second to twenty-fifth aspects, wherein the receiving the third message comprises: receiving the third message using a time resource associated with at least one beam of a plurality of beams of the scheduling entity measured by the UE using the plurality of CSI-RSs.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-19 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-19 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A user equipment (UE) for wireless communication, comprising:
   a transceiver for wireless communication;
   a memory; and
   one or more processors coupled with the transceiver and the memory, wherein the one or more processors are configured to:
      transmit, to a scheduling entity, a first message that initiates a random access channel (RACH) procedure;
      receive, from the scheduling entity, a second message of the RACH procedure, the second message comprising an indication of one or more channel state information reference signal (CSI-RS) resources for receiving a plurality of CSI-RSs from the scheduling entity;
      receive, from a same beam of the scheduling entity, the plurality of CSI-RSs using the one or more CSI-RS resources;
      determine a respective quality of the plurality of CSI-RSs corresponding to a plurality of receive beams of the UE;
      select one of the plurality of receive beams for communicating with the scheduling entity based on the determined quality of the plurality of CSI-RSs; and
      transmit, using the selected one of the plurality of receive beams, a third message of the RACH procedure.

2. The UE of claim 1, wherein to receive the second message, the one or more processors are further configured to:
receive downlink control information (DCI) on a physical download control channel (PDCCH), the DCI comprising the indication of the one or more CSI-RS resources; or
receive, on a physical downlink shared channel (PDSCH), the indication of the one or more CSI-RS resources.

3. The UE of claim 2, wherein the indication is configured to indicate the one or more CSI-RS resources based on at least one of:
scheduling information in the DCI for scheduling the one or more CSI-RS resources;
one or more predetermined rules associated with resources used to receive the PDCCH; or
a bitfield contained in the DCI configured to indicate one or more predetermined rules associated the one or more CSI-RS resources.

4. The UE of claim 2, wherein the indication is configured to indicate the one or more CSI-RS resources based on at least one of:
scheduling information in the PDSCH for scheduling the one or more CSI-RS resources;
first communication resources used for receiving the PDSCH;
second communication resources scheduled for transmitting the third message of the RACH procedure;
one or more predetermined rules associated with the first communication resources or the second communication resources; or
a bitfield contained in the PDSCH configured to indicate one or more predetermined rules associated the one or more CSI-RS resources.

5. The UE of claim 1, wherein the second message comprises DCI containing a bitfield indicating that the UE provides a Layer 1 (L1) measurement report in response to the plurality of CSI-RSs, and the one or more processors are further configured to:
measure a beam quality metric for at least one beam of a plurality of beams from the scheduling entity based on the one or more CSI-RSs, and
transmit the L1 measurement report to the scheduling entity, the L1 measurement report comprising the beam quality metric of the at least one beam of the plurality of beams.

6. The UE of claim 1, wherein the one or more processors are further configured to:
measure a beam quality metric for at least one beam of a plurality of beams from the scheduling entity based on the one or more CSI-RSs, and
determine communication resources for transmitting the third message based on the beam quality metric.

7. A method for wireless communication at a user equipment (UE), comprising:
transmitting, to a scheduling entity, a first message that initiates a random access channel (RACH) procedure;
receiving, from the scheduling entity, a second message of the RACH procedure, the second message comprising an indication of one or more channel state information reference signal (CSI-RS) resources for receiving a plurality of CSI-RSs from the scheduling entity;
receiving, from a same beam of the scheduling entity, the plurality of CSI-RSs using the one or more CSI-RS resources;
determining a respective quality of the plurality of CSI-RSs corresponding to a plurality of receive beams of the UE;
selecting one of the plurality of receive beams for communicating with the scheduling entity based on the determined quality of the plurality of CSI-RSs; and
transmitting, using the selected one of the plurality of receive beams, a third message of the RACH procedure.

8. The method of claim 7, wherein the receiving the second message comprises:
receiving downlink control information (DCI) on a physical download control channel (PDCCH), the DCI comprising the indication of the one or more CSI-RS resources; or
receiving, on a physical downlink shared channel (PDSCH), the indication of the one or more CSI-RS resources.

9. The method of claim 8, wherein the indication is configured to indicate the one or more CSI-RS resources based on at least one of:
scheduling information in the DCI for scheduling the one or more CSI-RS resources;
one or more predetermined rules associated with resources used to receive the PDCCH; or
a bitfield contained in the DCI configured to indicate one or more predetermined rules associated the one or more CSI-RS resources.

10. The method of claim 8, wherein the indication is configured to indicate the one or more CSI-RS resources based on at least one of:
scheduling information in the PDSCH for scheduling the one or more CSI-RS resources;
first communication resources used for receiving the PDSCH;
second communication resources scheduled for transmitting the third message of the RACH procedure;
one or more predetermined rules associated with the first communication resources or the second communication resources; or
a bitfield contained in the PDSCH configured to indicate one or more predetermined rules associated the one or more CSI-RS resources.

11. The method of claim 7, wherein the second message comprises DCI containing a bitfield indicating that the UE provides a Layer 1 (L1) measurement report in response to the plurality of CSI-RSs, and further comprising:
measuring a beam quality metric for at least one beam of a plurality of beams from the scheduling entity based on the one or more CSI-RSs, and
transmitting the L1 measurement report to the scheduling entity, the L1 measurement report comprising the beam quality metric of the at least one beam of the plurality of beams.

12. The method of claim 7, further comprising:
measuring a beam quality metric for at least one beam of a plurality of beams from the scheduling entity based on the one or more CSI-RSs, and
determining communication resources for transmitting the third message based on the beam quality metric.

13. A scheduling entity for wireless communication, comprising:
a transceiver for wireless communication;
a memory; and
one or more processors coupled with the transceiver and the memory, wherein the one or more processors are configured to:

receive, from a user equipment (UE), a first message that initiates a random access channel (RACH) procedure;

transmit, to the UE, a second message of the RACH procedure, the second message comprising an indication of one or more channel state information reference signal (CSI-RS) resources for transmitting a plurality of CSI-RSs, and a field indicating that the plurality of CSI-RSs not being associated with a feedback report;

transmit, in a same beam of the scheduling entity, the plurality of CSI-RSs using the one or more CSI-RS resources; and receive a third message of the RACH procedure after transmitting the plurality of CSI-RS s.

14. The scheduling entity of claim 13, wherein to transmit the second message, the one or more processors are further configured to:

transmit downlink control information (DCI) on a physical download control channel (PDCCH), the DCI comprising the indication of the one or more CSI-RS resources; or transmit, on a physical downlink shared channel (PDSCH), the indication of the one or more CSI-RS resources.

15. The scheduling entity of claim 14, wherein the indication is configured to indicate the one or more CSI-RS resources based on at least one of:

scheduling information in the DCI for scheduling the one or more CSI-RS resources;

one or more predetermined rules associated with resources used to transmit the PDCCH; or a bitfield contained in the DCI configured to indicate one or more predetermined rules associated the one or more CSI-RS resources.

16. The scheduling entity of claim 14, wherein the indication is configured to indicate the one or more CSI-RS resources based on at least one of:

scheduling information in the PDSCH for scheduling the one or more CSI-RS resources;

first communication resources used for transmitting the PDSCH;

second communication resources scheduled for receiving the third message of the RACH procedure;

one or more predetermined rules associated with the first communication resources or the second communication resources; or a bitfield contained in the PDSCH configured to indicate one or more predetermined rules associated the one or more CSI-RS resources.

17. The scheduling entity of claim 13, wherein the second message comprises DCI containing a bitfield indicating that the UE provides a Layer 1 (L1) measurement report in response to the plurality of CSI-RSs, and further comprising:

receiving a Layer (L1) measurement report from the UE, the L1 measurement report comprising a beam quality metric of at least one beam of a plurality of beams of the scheduling entity based on the one or more CSI-RSs.

18. The scheduling entity of claim 13, wherein to receive the third message, the one or more processors are further configured to:

receive the third message using a time resource associated with at least one beam of a plurality of beams of the scheduling entity measured by the UE using the plurality of CSI-RSs.

19. A method of wireless communication at a scheduling entity, the method comprising:

receiving, from a user equipment (UE), a first message that initiates a random access channel (RACH) procedure;

transmitting, to the UE, a second message of the RACH procedure, the second message comprising an indication of one or more channel state information reference signal (CSI-RS) resources for transmitting a plurality of CSI-RSs, and a field indicating that the plurality of CSI-RSs not being associated with a feedback report;

transmitting, in a same beam of the scheduling entity, the plurality of CSI-RSs using the one or more CSI-RS resources; and receiving a third message of the RACH procedure after transmitting the plurality of CSI-RSs.

20. The method of claim 19, wherein the transmitting the second message comprises:

transmitting downlink control information (DCI) on a physical download control channel (PDCCH), the DCI comprising the indication of the one or more CSI-RS resources; or transmitting, on a physical downlink shared channel (PDSCH), the indication of the one or more CSI-RS resources.

21. The method of claim 20, wherein the indication is configured to indicate the one or more CSI-RS resources based on at least one of:

scheduling information in the DCI for scheduling the one or more CSI-RS resources;

one or more predetermined rules associated with resources used to transmit the PDCCH; or a bitfield contained in the DCI configured to indicate one or more predetermined rules associated the one or more CSI-RS resources.

22. The method of claim 20, wherein the indication is configured to indicate the one or more CSI-RS resources based on at least one of:

scheduling information in the PDSCH for scheduling the one or more CSI-RS resources;

first communication resources used for transmitting the PDSCH;

second communication resources scheduled for receiving the third message of the RACH procedure;

one or more predetermined rules associated with the first communication resources or the second communication resources; or a bitfield contained in the PDSCH configured to indicate one or more predetermined rules associated the one or more CSI-RS resources.

23. The method of claim 19, wherein the second message comprises DCI containing a bitfield indicating that the UE provides a Layer 1 (L1) measurement report in response to the plurality of CSI-RSs, and further comprising:

receiving a Layer (L1) measurement report from the UE, the L1 measurement report comprising a beam quality metric of at least one beam of a plurality of beams of the scheduling entity based on the one or more CSI-RSs.

24. The method of claim 19, wherein the receiving the third message comprises:

receiving the third message using a time resource associated with at least one beam of a plurality of beams of the scheduling entity measured by the UE using the plurality of CSI-RSs.

* * * * *